(12) United States Patent
Zhamu et al.

(10) Patent No.: US 10,700,357 B2
(45) Date of Patent: Jun. 30, 2020

(54) ALKALI METAL-SULFUR SECONDARY BATTERY CONTAINING A PROTECTED SULFUR CATHODE MATERIAL AND MANUFACTURING METHOD

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 348 days.

(21) Appl. No.: 15/676,672

(22) Filed: Aug. 14, 2017

(65) Prior Publication Data
US 2019/0051902 A1 Feb. 14, 2019

(51) Int. Cl.
| | |
|---|---|
| H01M 4/62 | (2006.01) |
| H01M 4/136 | (2010.01) |
| H01M 4/133 | (2010.01) |
| H01M 4/36 | (2006.01) |
| H01M 10/0565 | (2010.01) |

(Continued)

(52) U.S. Cl.
CPC ........... *H01M 4/622* (2013.01); *H01M 4/133* (2013.01); *H01M 4/136* (2013.01); *H01M 4/366* (2013.01); *H01M 4/38* (2013.01); *H01M 4/583* (2013.01); *H01M 4/5815* (2013.01); *H01M 4/5825* (2013.01); *H01M 4/62* (2013.01); *H01M 4/625* (2013.01); *H01M 10/052* (2013.01); *H01M 10/054* (2013.01); *H01M 10/056* (2013.01); *H01M 10/0525* (2013.01); *H01M 10/0565* (2013.01); *H01M 10/0568* (2013.01);

(Continued)

(58) Field of Classification Search
None
See application file for complete search history.

(56) References Cited

U.S. PATENT DOCUMENTS

| | | | |
|---|---|---|---|
| 10,084,182 B2 * | 9/2018 | Pan | H01M 4/587 |
| 10,411,264 B2 * | 9/2019 | Pan | H01M 4/366 |

(Continued)

OTHER PUBLICATIONS

Choi, Sunghun, et al. "Highly Elastic Binders Integrating Polyrotaxanes for Silicon Microparticle Anodes in Lithium Ion Batteries," Science 357, 279 283(2017), Jul. 21, 2017; Downloaded from http://science.sciencemag.org/ on Sep. 16, 2018.*

(Continued)

*Primary Examiner* — Rena Dye Cronin

(57) ABSTRACT

Provided is a rechargeable alkali metal-sulfur cell comprising an anode active material layer, an electrolyte, and a cathode active material layer containing multiple particulates of a sulfur-containing material and wherein at least one of the particulates is composed of one or a plurality of sulfur-containing material particles being embraced or encapsulated by a thin layer of a high-elasticity polymer (containing a polyrotaxane network having a rotaxane structure or a polyrotaxane structure at a crosslink point of the polyrotaxane network) having a recoverable tensile strain from 2% to 1,500%, a lithium ion conductivity no less than $10^{-6}$ S/cm at room temperature, and a thickness from 0.5 nm to 10 μm. This battery exhibits an excellent combination of high sulfur content, high sulfur utilization efficiency, high energy density, and long cycle life.

64 Claims, 12 Drawing Sheets

(51) Int. Cl.
*H01M 10/0525* (2010.01)
*H01M 10/0568* (2010.01)
*H01M 10/0569* (2010.01)
*H01M 4/58* (2010.01)
*H01M 4/583* (2010.01)
*H01M 10/054* (2010.01)
*H01M 10/052* (2010.01)
*H01M 4/38* (2006.01)
*H01M 10/056* (2010.01)

(52) U.S. Cl.
CPC .............. *H01M 10/0569* (2013.01); *H01M 2300/0028* (2013.01); *H01M 2300/0082* (2013.01)

(56) References Cited

U.S. PATENT DOCUMENTS

| | | |
|---|---|---|
| 2012/0088154 A1 | 4/2012 | Liu et al. |
| 2013/0171339 A1 | 7/2013 | Wang et al. |
| 2014/0234702 A1 | 8/2014 | Zhang et al. |

OTHER PUBLICATIONS

Xiulei et al., "A highly ordered nanostructured carbon-sulphur cathode for lithium-sulphur batteries" Nature Materials (2009) vol. 8, pp. 500-506.
PCT/US18/43652 International Search Report and Written Opinion dated Oct. 16, 2018, 10 pages.

* cited by examiner

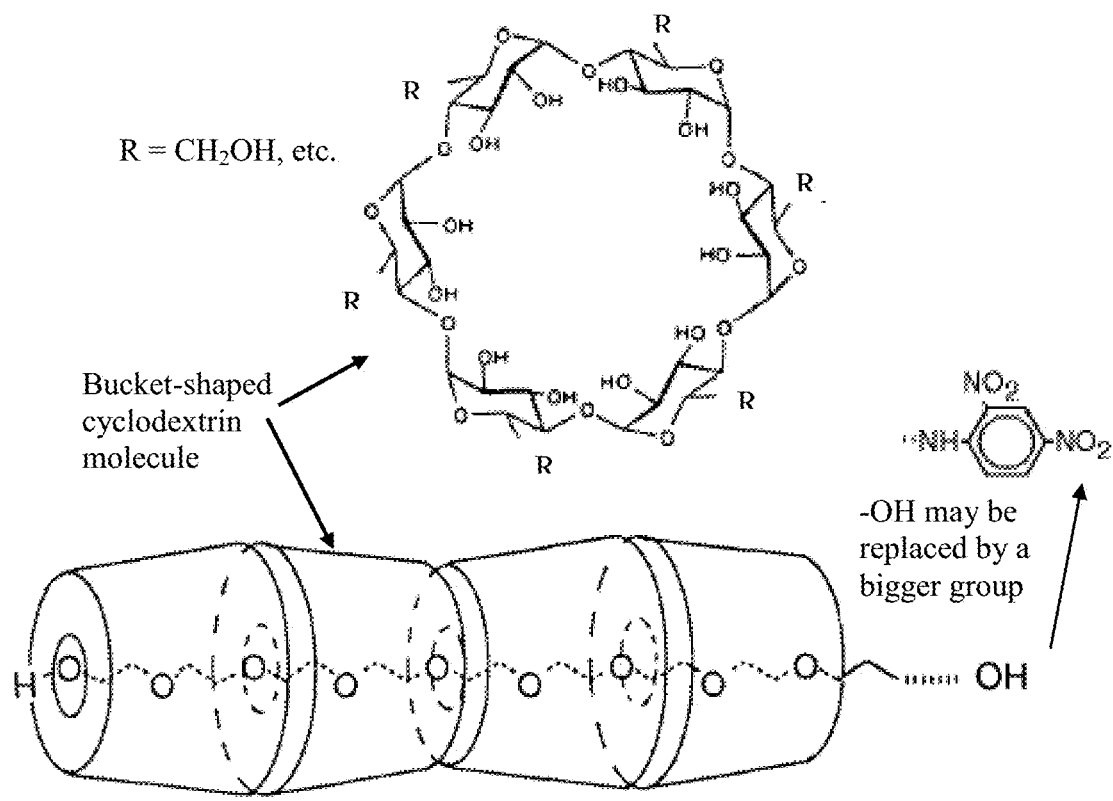
FIG. 10(A) (Schematic A)
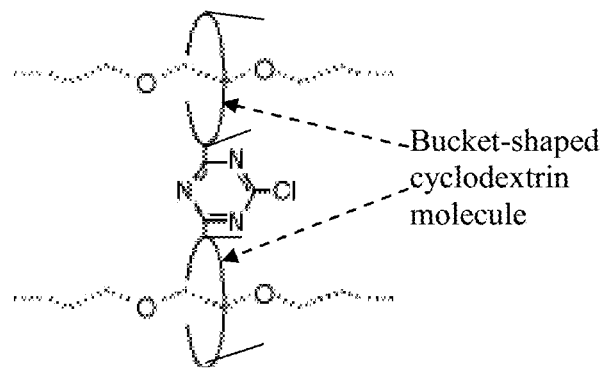
FIG. 10(B) (Schematic B)

ALKALI METAL-SULFUR SECONDARY BATTERY CONTAINING A PROTECTED SULFUR CATHODE MATERIAL AND MANUFACTURING METHOD

FIELD OF THE INVENTION

The present invention provides a cathode composition and structure in a secondary or rechargeable alkali metal-sulfur battery, including the lithium-sulfur battery, sodium-sulfur battery, and potassium-sulfur battery.

BACKGROUND

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 140-170 mAh/g. As a result, the specific energy of commercially available Li-ion cells is typically in the range of 120-220 Wh/kg, most typically 150-180 Wh/kg. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8+16Li \leftrightarrow 8Li_2S$ that lies near 2.2 V with respect to $Li^+/Li^\circ$. This electrochemical potential is approximately ⅔ of that exhibited by conventional positive electrodes (e.g. $LiMnO_4$). However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/l, respectively, based on the combined Li and S weight or volume. If based on the total cell weight or volume, the energy densities can reach approximately 1,000 Wh/kg and 1,100 Wh/l, respectively. However, the current Li-sulfur cells reported by industry leaders in sulfur cathode technology have a maximum cell specific energy of 250-400 Wh/kg (based on the total cell weight), which is far below what is possible.

In summary, despite its considerable advantages, the Li—S cell is plagued with several major technical problems that have thus far hindered its widespread commercialization:

(1) Conventional lithium metal cells still have dendrite formation and related internal shorting issues.

(2) Sulfur or sulfur-containing organic compounds are highly insulating, both electrically and ionically. To enable a reversible electrochemical reaction at high current densities or charge/discharge rates, the sulfur must maintain intimate contact with an electrically conductive additive. Various carbon-sulfur composites have been utilized for this purpose, but only with limited success owing to the limited scale of the contact area. Typical reported capacities are between 300 and 550 mAh/g (based on the cathode carbon-sulfur composite weight) at moderate rates.

(3) The cell tends to exhibit significant capacity decay during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator to the Li negative electrode whereupon they are reduced to solid precipitates ($Li_2S_2$ and/or $Li_2S$), causing active mass loss. In addition, the solid product that precipitates on the surface of the positive electrode during discharge becomes electrochemically irreversible, which also contributes to active mass loss.

(4) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications.

For instance, Ji, et al reported that cathodes based on nanostructured sulfur/meso-porous carbon materials could overcome these challenges to a large degree, and exhibit stable, high, reversible capacities with good rate properties and cycling efficiency [Xiulei Ji, Kyu Tae Lee, & Linda F. Nazar, "A highly ordered nanostructured carbon-sulphur cathode for lithium-sulphur batteries," *Nature Materials* 8, 500-506 (2009)]. However, the fabrication of the proposed highly ordered meso-porous carbon structure requires a tedious and expensive template-assisted process. It is also challenging to load a large proportion of sulfur into these meso-scaled pores using a physical vapor deposition or solution precipitation process.

Zhang, et al. (US Pub. No. 2014/0234702; Aug. 21, 2014) makes use of a chemical reaction method of depositing S particles on surfaces of isolated graphene oxide (GO) sheets. But, this method is incapable of creating a large proportion of ultra-small S particles on GO surfaces (i.e. typically <66% of S in the GO-S nanocomposite composition). The resulting Li—S cells also exhibit poor rate capability; e.g. the specific capacity of 1,100 mAh/g (based on S weight) at 0.02 C rate is reduced to <450 mAh/g at 1.0 C rate. It may be noted that the highest achievable specific capacity of 1,100 mAh/g represents a sulfur utilization efficiency of only 1,100/1,675=65.7% even at such a low charge/discharge rate (0.02 C means completing the charge or discharge process in 1/0.02=50 hours; 1 C=1 hour, 2 C=½ hours, and 3 C=⅓ hours, etc.) Further, such a S-GO nanocomposite cathode-based Li—S cell exhibits very poor cycle life, with the capacity typically dropping to less than 60% of its original capacity in less than 40 charge/discharge cycles. Such a short cycle life makes this Li—S cell not useful for any practical application. Another chemical reaction method of depositing S particles on graphene oxide surfaces is disclosed by Wang, et al. (US Pub. No. 2013/0171339; Jul. 4, 2013). This Li—S cell still suffers from the same problems.

A solution precipitation method was disclosed by Liu, et al. (US Pub. No. 2012/0088154; Apr. 12, 2012) to prepare graphene-sulfur nanocomposites (having sulfur particles adsorbed on GO surfaces) for use as the cathode material in a Li—S cell. The method entails mixing GO sheets and S in a solvent ($CS_2$) to form a suspension. The solvent is then evaporated to yield a solid nanocomposite, which is then ground to yield nanocomposite powder having primary sulfur particles with an average diameter less than approximately 50 nm. Unfortunately, this method does not appear to be capable of producing S particles less than 40 nm. The resulting Li—S cell exhibits very poor cycle life (a 50% decay in capacity after only 50 cycles). Even when these nanocomposite particles are encapsulated in a polymer, the Li—S cell retains less than 80% of its original capacity after 100 cycles. The cell also exhibits a poor rate capability (specific capacity of 1,050 mAh/g(S wt.) at 0.1 C rate, dropped to <580 mAh/g at 1.0 C rate). Again, this implies that a large proportion of S did not contribute to the lithium storage, resulting in a low S utilization efficiency.

Furthermore, all of the aforementioned methods involve depositing S particles onto surfaces of isolated graphene sheets. The presence of S particles (one of the most insulating materials) adhered to graphene surfaces would make the resulting electrode structure non-conducting when multiple S-bonded graphene sheets are packed together. These S particles prevent graphene sheets from contacting each other, making it impossible for otherwise conducting graphene sheets to form a 3-D network of electron-conducting paths in the cathode. This unintended and unexpected outcome is another reason why these prior art Li—S cells have performed so poorly.

Despite the various approaches proposed for the fabrication of high energy density Li—S cells, there remains a need for cathode materials, production processes, and cell operation methods that retard the out-diffusion of S or lithium polysulfide from the cathode compartments into other components in these cells, improve the utilization of electroactive cathode materials (S utilization efficiency), and provide rechargeable Li—S cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-sulfur secondary battery if dendrite related issues could be addressed.

Sodium metal (Na) and potassium metal (K) have similar chemical characteristics to Li and the sulfur cathode in room temperature sodium-sulfur cells (RT Na—S batteries) or potassium-sulfur cells (K—S) face the same issues observed in Li—S batteries, such as: (i) low active material utilization rate, (ii) poor cycle life, and (iii) low Coulombic efficiency. Again, these drawbacks arise mainly from insulating nature of S, dissolution of S and Na or K polysulfide intermediates in liquid electrolytes (and related Shuttle effect), and large volume change during charge/discharge.

Hence, an object of the present invention is to provide a rechargeable alkali metal battery (e.g., Li—S, Na—S, and K—S battery) that exhibits an exceptionally high specific energy or high energy density. One particular technical goal of the present invention is to provide an alkali metal-sulfur or alkali ion-sulfur cell with a cell specific energy greater than 400 Wh/Kg, preferably greater than 500 Wh/Kg, and more preferably greater than 600 Wh/Kg (all based on the total cell weight).

Another object of the present invention is to provide an alkali metal-sulfur cell that exhibits a high cathode specific capacity (higher than 1,200 mAh/g based on the sulfur weight, or higher than 1,000 mAh/g based on the cathode composite weight, including sulfur, conducting additive or substrate, and binder weights combined, but excluding the weight of cathode current collector). The specific capacity is preferably higher than 1,400 mAh/g based on the sulfur weight alone or higher than 1,200 mAh/g based on the cathode composite weight. This must be accompanied by a high specific energy, good resistance to dendrite formation, and a long and stable cycle life.

It may be noted that in most of the open literature reports (scientific papers) and patent documents, scientists or inventors choose to express the cathode specific capacity based on the sulfur or lithium polysulfide weight alone (not the total cathode composite weight), but unfortunately a large proportion of non-active materials (those not capable of storing lithium, such as conductive additive and binder) is typically used in their Li—S cells. For practical use purposes, it is more meaningful to use the cathode composite weight-based capacity value.

A specific object of the present invention is to provide a rechargeable alkali metal-sulfur cell based on rational materials and battery designs that overcome or significantly reduce the following issues commonly associated with conventional Li—S and Na—S cells: (a) dendrite formation (internal shorting); (b) extremely low electric and ionic conductivities of sulfur, requiring large proportion (typically 30-55%) of non-active conductive fillers and having significant proportion of non-accessible or non-reachable sulfur or alkali metal polysulfides); (c) poor sulfur utilization efficiency; (d) dissolution of S and alkali metal polysulfide in electrolyte; (e) migration of alkali metal polysulfides from the cathode to the anode (which irreversibly react with Li, Na, or K at the anode), resulting in active material loss and capacity decay (the shuttle effect); and (f) short cycle life.

SUMMARY OF THE INVENTION

The present invention provides an alkali metal-sulfur cell (e.g. lithium-sulfur cell, sodium-sulfur cell, and potassium-sulfur cell). The lithium-sulfur battery can include the lithium metal-sulfur battery (having lithium metal as the anode active material and sulfur as the cathode active material) and the lithium ion-sulfur battery (e.g. Si or graphite as the anode active material and sulfur as the cathode active material). The sodium-sulfur battery can include the sodium metal-sulfur battery (having sodium metal as the anode active material and sulfur as the cathode active material) and the sodium ion-sulfur battery (e.g. hard carbon as the anode active material and sulfur as the cathode active material).

The alkali metal-sulfur cell comprises (a) an anode active material layer and an optional anode current collector supporting the anode active material layer; (b) a cathode active material layer and an optional cathode current collector supporting the cathode active material layer; and (c) an electrolyte with an optional porous separator layer in ionic contact with the anode active material layer and the cathode active material layer.

In this cell, the cathode active material layer contains multiple particulates of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof and wherein at least one of the particulates is composed of one or a plurality of the sulfur-containing material particles being fully embraced or encapsulated by a thin layer of a high-elasticity polymer having a recoverable tensile strain from 2% to 1,500% when measured without an additive or reinforcement, a lithium ion conductivity no less than $10^{-6}$ S/cm (typically from $10^{-5}$ S/cm to $5\times10^{-2}$ S/cm, measured at room temperature), and a thickness from 0.5 nm to 10 μm (typically from 1 nm to 1 μm, but preferably <100 nm and more preferably <10 nm). The high-elasticity polymer contains a polyrotaxane network having a rotaxane structure or a polyrotaxane structure at a crosslink point of said polyrotaxane network.

Preferably, the rotaxane structure or polyrotaxane structure is selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof.

In certain embodiments, the polyrotaxane network contains a polymer selected from polyethylene glycol, polypropylene glycol, polyethylene oxide, polypropylene oxide, poly (succinic acid), an aliphatic polyester, or a combination thereof.

The sulfur-carbon hybrid, sulfur-graphite hybrid, sulfur-graphene hybrid, or conducting polymer-sulfur hybrid may be a mixture, blend, composite, or chemically or physically bonded entity of sulfur or sulfide with a carbon, graphite, graphene, or conducting polymer material. For instance, a sulfur-graphene hybrid can be a simple mixture (in a particle form) of sulfur and graphene prepared by ball-milling. Such a hybrid can contain sulfur bonded on surfaces of a graphene oxide sheet, etc. As another example, the sulfur-carbon hybrid can be a simple mixture (in a particle form) of sulfur and carbon nanotubes, or can contain sulfur residing in pores of activated carbon particles.

In the rechargeable alkali metal-sulfur cell, the metal sulfide may contain a material denoted by $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M preferably is selected from Li, Na, K, Mg, Zn, Cu, Ti, Ni, Co, Fe, or Al.

In some preferred embodiments, the metal sulfide in the cathode layer contains $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S_1$, $K_2S_2$, $K_2S_3$, $K_2S_4$, $K_2S_5$, $K_2S_6$, $K_2S_7$, $K_2S_8$, $K_2S_9$, or $K_2S_{10}$.

In the rechargeable alkali metal-sulfur cell, the carbon or graphite material in the cathode active material layer may be selected from mesophase pitch, mesophase carbon, mesocarbon micro-bead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof. The graphene may be selected from pristine graphene, graphene oxide, reduced graphene oxide (RGO), graphene fluoride, nitrogenated graphene, hydrogenated graphene, doped graphene, functionalized graphene, or a combination thereof.

The conducting polymer-sulfur hybrid may preferably contain an intrinsically conductive polymer selected from polyaniline, polypyrrole, polythiophene, polyfuran, a bi-cyclic polymer, a sulfonated derivative thereof, or a combination thereof.

In certain embodiments, the high-elasticity polymer contains from 0.1% to 50% by weight of a lithium ion-conducting additive dispersed therein, or contains therein from 0.1% by weight to 10% by weight of a reinforcement nanofilament selected from carbon nanotube, carbon nanofiber, graphene, or a combination thereof.

In certain embodiments, the high-elasticity polymer is mixed with a lithium ion-conducting additive to form a composite wherein the lithium ion-conducting additive is dispersed in the high-elasticity UHMW polymer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$ In certain embodiments, the high-elasticity polymer is mixed with a lithium ion-conducting additive or sodium ion-conducting additive to form a composite wherein the lithium ion- or sodium ion-conducting additive is dispersed in the high-elasticity polymer. The additive may be selected from the following lithium salts or their sodium salt counterparts: lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoroethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

In certain preferred embodiments, the high-elasticity polymer is mixed with an electron-conducting polymer selected from polyaniline, polypyrrole, polythiophene, polyfuran, a bi-cyclic polymer, a sulfonated derivative thereof, or a combination thereof.

In certain embodiments, the high-elasticity polymer forms a mixture or blend with a lithium ion-conducting polymer selected from a lower molecular weight (<500,000 g/mole) version of poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof.

Typically, the high-elasticity polymer has a lithium ion conductivity from $1 \times 10^{-5}$ S/cm to $5 \times 10^{-2}$ S/cm at room temperature.

The present invention enables the rechargeable alkali metal-sulfur cell to deliver a sulfur utilization efficiency from 80% to 99%, more typically from 85% to 97%.

In the rechargeable alkali metal-sulfur cell, the electrolyte is selected from polymer electrolyte, polymer gel electrolyte, composite electrolyte, ionic liquid electrolyte, aqueous electrolyte, organic liquid electrolyte, soft matter phase electrolyte, solid-state electrolyte, or a combination thereof. The electrolyte may contain a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), Lithium bis(oxalato)borate (LiBOB), lithium oxalyldifluoroborate ($LiBF_2C_2O_4$), lithium oxalyldifluoroborate ($LiBF_2C_2O_4$), Lithium nitrate ($LiNO_3$), Li-Fluoroalkyl-Phosphates ($LiPF_3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

The solvent may be selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

In certain embodiments, the anode active material layer of the invented cell contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof.

The rechargeable alkali metal-sulfur cell may be a lithium ion-sulfur cell and, in this case, the anode active material layer contains an anode active material selected from the group consisting of: (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof and combinations thereof.

The rechargeable alkali metal-sulfur cell may be a sodium ion-sulfur cell or potassium ion-sulfur cell and, in this case, the anode active material layer contains an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof; and combinations thereof.

Preferably, in the rechargeable alkali metal-sulfur cell, the particulates contain from 80% to 99% by weight of sulfur, metal sulfide, or metal compound based on the total weight of the high-capacity polymer and the sulfur, metal sulfide, or metal compound combined.

The present invention also provides a cathode active material layer for a rechargeable alkali metal-sulfur cell. This cathode active material layer contains multiple particulates of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof and wherein at least one of said particulates is composed of one or a plurality of sulfur-containing material particles being embraced or encapsulated by a thin layer of a high-elasticity polymer having a recoverable tensile strain no less than 2% (up to 1,500%, more typically up to 1,000%) when measured without an additive or reinforcement, a lithium ion conductivity no less than $10^{-6}$ S/cm at room temperature (typically up to $5 \times 10^{-2}$ S/cm), and a thickness from 0.5 nm to 10 μm (preferably and typically from 1 nm to 1 μm, more preferably <100 nm).

The high-elasticity polymer contains a polyrotaxane network having a rotaxane structure or a polyrotaxane structure at a crosslink point of said polyrotaxane network. Preferably, the rotaxane structure or polyrotaxane structure is selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof. In certain embodiments, the polyrotaxane network contains a polymer selected from polyethylene glycol, polypropylene glycol, polyethylene oxide, polypropylene oxide, poly (succinic acid), an aliphatic polyester, or a combination thereof.

In this product (a cathode layer), the sulfur-carbon hybrid, sulfur-graphite hybrid, sulfur-graphene hybrid, or conducting polymer-sulfur hybrid is a mixture, blend, composite, chemically or physically bonded entity of sulfur or sulfide with a carbon, graphite, graphene, or conducting polymer material.

In the cathode active material layer, the metal sulfide may contain $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

The carbon or graphite material in the cathode active material layer may be selected from mesophase pitch, mesophase carbon, mesocarbon micro-bead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof.

This cathode active material layer further comprises a binder resin that bonds the multiple particulates (of encapsulated sulfur-containing particles) together to form the cathode active material layer, wherein the binder resin is not part of the multiple particulates (i.e. not included inside the core portion of a particulate) and is external to the multiple particulates. In other words, the high-elasticity polymer does not embrace the binder resin and the binder resin does not embrace the particulates either.

In the alternative, the present invention also provides a cathode active material layer (containing an active layer and a protective layer covering the active layer) for a rechargeable alkali metal-sulfur cell. The active layer contains a resin binder, an optional conductive additive, and multiple particles of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof, wherein the sulfur-containing material particles are bonded by the resin binder to form an integral solid layer (a layer of adequate structural integrity so that it can be freely-standing). This integral solid layer (the active layer) is covered and protected by a thin layer of a high-elasticity polymer having a recoverable tensile strain no less than 2%, a lithium ion conductivity no less than $10^{-6}$ S/cm at room temperature, and a thickness from 0.5 nm to 10 μm. In some embodiments, the integral solid layer is bonded by the resin binder to a cathode current collector.

The high-elasticity polymer contains a polyrotaxane network having a rotaxane structure or a polyrotaxane structure at a crosslink point of said polyrotaxane network. Preferably, the rotaxane structure or polyrotaxane structure is selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof. In certain embodiments, the polyrotaxane network contains a polymer selected from polyethylene glycol, polypropylene glycol, polyethylene oxide, polypropylene oxide, poly (succinic acid), an aliphatic polyester, or a combination thereof.

Such a high-elasticity polymer protective layer can be formed by spraying a solution of the polymer or its precursor dissolved in a liquid solvent (along with a lithium salt and/or other additive) over a pre-made cathode active layer and then removing the solvent.

The invention also provides a rechargeable alkali metal-sulfur cell that contains such a cathode active material layer protected by a discrete layer of a high-elasticity polymer. This alkali metal-sulfur cell comprises: (a) an anode active material layer and an optional anode current collector supporting the anode active material layer; (b) a cathode that contains this cathode active material layer; and (c) an electrolyte with an optional porous separator layer in ionic contact with the anode active material layer and the cathode active material layer.

The present invention also provides a powder mass product for use in a lithium-sulfur battery cathode. The powder mass comprises multiple particulates of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof and wherein at least one of said particulates is composed of one or a plurality of sulfur-containing material particles being embraced or encapsulated by a thin layer of a high-elasticity polymer having a recoverable tensile strain no less than 2% when measured without an additive or reinforcement, a lithium ion conductivity no less than $10^{-6}$ S/cm at room temperature, and a thickness from 0.5 nm to 10 μm.

The high-elasticity polymer contains a polyrotaxane network having a rotaxane structure or a polyrotaxane structure at a crosslink point of said polyrotaxane network. Preferably, the rotaxane structure or polyrotaxane structure is selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof. In certain embodiments, the polyrotaxane network contains a polymer selected from polyethylene glycol, polypropylene glycol, polyethylene oxide, polypropylene oxide, poly (succinic acid), an aliphatic polyester, or a combination thereof.

In the powder mass, the sulfur-carbon hybrid, sulfur-graphite hybrid, sulfur-graphene hybrid, or conducting polymer-sulfur hybrid is a mixture, blend, composite, chemically or physically bonded entity of sulfur or sulfide with a carbon, graphite, graphene, or conducting polymer material.

In the powder mass, the metal sulfide preferably contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

The present invention also provides a method of manufacturing a rechargeable alkali metal-sulfur cell. The method comprises: (a) providing a cathode and an optional cathode current collector to support the cathode; (b) providing an alkali metal anode, selected from Li, Na, K, or a combination thereof and an optional anode current collector to support the anode; (c) providing an electrolyte in contact with the anode and the cathode and an optional separator electrically separating the anode and the cathode; wherein the cathode contains multiple particulates of a sulfur-containing material wherein at least one of the particulates is composed of one or a plurality of sulfur-containing material particles which are embraced or encapsulated by a thin layer of a high-elasticity polymer having a recoverable tensile strain from 2% to 1,500% when measured without an additive or reinforcement (more typically from 10% to 1000% and most typically from 30% to 300%), a lithium ion conductivity no less than $10^{-6}$ S/cm (typically from $1\times10^{-5}$ S/cm to $5\times10^{-2}$ S/cm) at room temperature, and a thickness from 0.5 nm to 10 μm (preferably from 1 nm to 1 more preferably from 1 nm to 100 nm, and most preferably, from 1 nm to 10 nm).

The high-elasticity polymer contains a polyrotaxane network having a rotaxane structure or a polyrotaxane structure at a crosslink point of said polyrotaxane network. Preferably, the rotaxane structure or polyrotaxane structure is selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof. In certain embodiments, the polyrotaxane network contains a polymer selected from polyethylene glycol, polypropylene glycol, polyethylene oxide, polypropylene oxide, poly (succinic acid), an aliphatic polyester, or a combination thereof.

In the above manufacturing method, the sulfur-containing material preferably is selected from a sulfur-carbon hybrid, sulfur-graphite hybrid, sulfur-graphene hybrid, conducting polymer-sulfur hybrid, metal sulfide, sulfur compound, or a combination thereof. The sulfur-carbon hybrid, sulfur-graphite hybrid, sulfur-graphene hybrid, or conducting polymer-sulfur hybrid is a mixture, blend, composite, chemically or physically bonded entity of sulfur or sulfide with a carbon, graphite, graphene, or conducting polymer material In the manufacturing method, the operation of providing multiple particulates may include encapsulating or embracing the one or a plurality of sulfur-containing material particles with a thin layer of high-elasticity polymer using a procedure selected from pan coating, air suspension, centrifugal extrusion, vibrational nozzle, spray-drying, ultrasonic spraying, coacervation-phase separation, interfacial polycondensation, in-situ polymerization, matrix polymerization, or a combination thereof.

In some embodiments, the operation of providing multiple particulates includes encapsulating or fully embracing one or a plurality of sulfur-containing material particles with a mixture of a high-elasticity polymer with an elastomer, an electronically conductive polymer, a lithium-ion conducting material, a reinforcement material, or a combination thereof. Preferably, the lithium-ion conducting material is dispersed in said high-elasticity polymer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li-SO_y$, or a combination thereof, wherein X=F, Cl, I, or Br, R=a hydrocarbon group, $0<x\le 1$ and $1\le y\le 4$.

In certain embodiments, the lithium ion-conducting material is dispersed in the high-elasticity polymer and is selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, LiN $(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

In the instant Li—S cell, the reversible specific capacity of the sulfur cathode is typically and preferably no less than 1,000 mAh per gram and often exceeds 1,200 or even 1,500 mAh per gram of entire cathode layer. The high specific capacity of the presently invented cathode, when combined with a lithium anode, typically leads to a cell specific energy significantly greater than 400 Wh/Kg, based on the total cell weight including anode, cathode, electrolyte, separator, and current collector weights combined. This specific energy value is not based on the cathode active material weight or cathode layer weight only (as sometimes did in open literature or patent applications); instead, this is based on entire cell weight. In many cases, the cell specific energy is higher than 500 Wh/Kg and, in some examples, exceeds 600 Wh/kg.

The invention also provides another method of manufacturing a rechargeable alkali metal-sulfur cell selected from lithium-sulfur cell, sodium-sulfur cell, or potassium-sulfur cell. The method comprises: (a) providing an anode containing an anode active material layer and an optional anode current collector supporting the anode active material layer; (b) providing a cathode containing an cathode active material layer protected and covered by high-elasticity polymer; (c) providing an electrolyte with an optional porous separator layer in ionic contact with the anode active material layer and the cathode active material layer; and (d) combining the anode, the cathode, and the electrolyte to form a battery unit and encasing the battery unit in a protective housing to form the rechargeable alkali metal-sulfur cell. The high-elasticity polymer contains a polyrotaxane network having a rotaxane structure or a polyrotaxane structure at a crosslink point of said polyrotaxane network. Preferably, the rotaxane structure or polyrotaxane structure is selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof. In certain embodiments, the polyrotaxane network contains a polymer selected from polyethylene glycol, polypropylene glycol, polyethylene oxide, polypropylene oxide, poly (succinic acid), an aliphatic polyester, or a combination thereof.

Also provided is a method of manufacturing a rechargeable alkali metal-sulfur cell selected from lithium-sulfur cell, sodium-sulfur cell, or potassium-sulfur cell. The method comprises: (a) providing an anode containing an anode active material layer and an optional anode current collector supporting the anode active material layer; (b) providing a cathode containing a cathode active material layer optionally supported on a cathode current collector; (c)

providing a porous separator layer and an electrolyte and in ionic contact with the anode active material layer and the cathode active material layer; and (d) implementing a layer of high-elasticity polymer between the cathode active material layer and the separator. This high-elasticity polymer has a recoverable tensile strain no less than 2%, a lithium ion conductivity no less than $10^{-6}$ S/cm at room temperature, and a thickness from 0.5 nm to 10 μm. This layer acts to block the diffusion of any sulfur or metal polysulfide (e.g. lithium polysulfide or sodium polysulfide) dissolved in the cathode from migrating to the anode side. This effectively reduces or eliminates the shuttling effect. The high-elasticity polymer contains a polyrotaxane network having a rotaxane structure or a polyrotaxane structure at a crosslink point of said polyrotaxane network. Preferably, the rotaxane structure or polyrotaxane structure is selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof. In certain embodiments, the polyrotaxane network contains a polymer selected from polyethylene glycol, polypropylene glycol, polyethylene oxide, polypropylene oxide, poly (succinic acid), an aliphatic polyester, or a combination thereof.

These and other advantages and features of the present invention will become more transparent with the description of the following best mode practice and illustrative examples.

BRIEF DESCRIPTION OF THE DRAWINGS

FIG. 10(A) Schematic of a polyrotaxane consisting of α-cyclodextrin (α-CD) and poly(ethylene glycol) (PEG), wherein a PEG chain penetrates multiple α-CD rings.

FIG. 10(B) Schematic of polymer chains with bulky end groups (e.g. bisamine) that are topologically interlocked by "figure-of-eight" cross-links.

DETAILED DESCRIPTION OF PREFERRED EMBODIMENTS

Figure 1A:
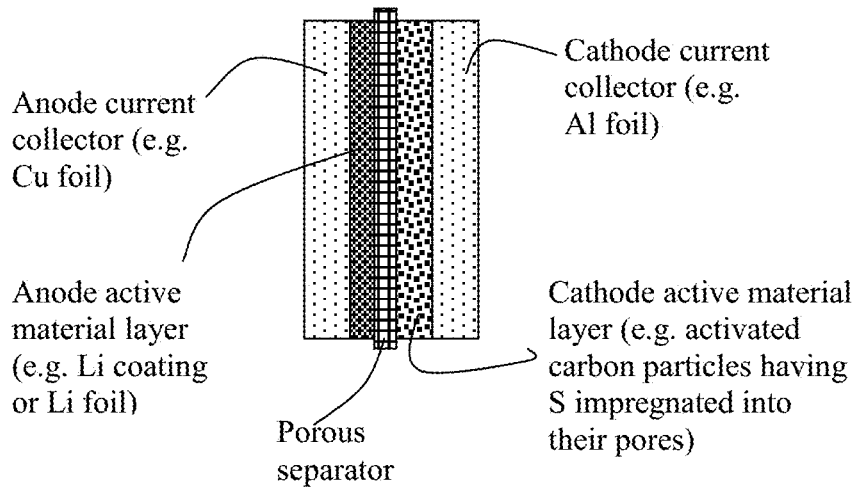
FIG. 1(A) Schematic of a prior art alkali metal-sulfur battery cell.
Figure 1B:
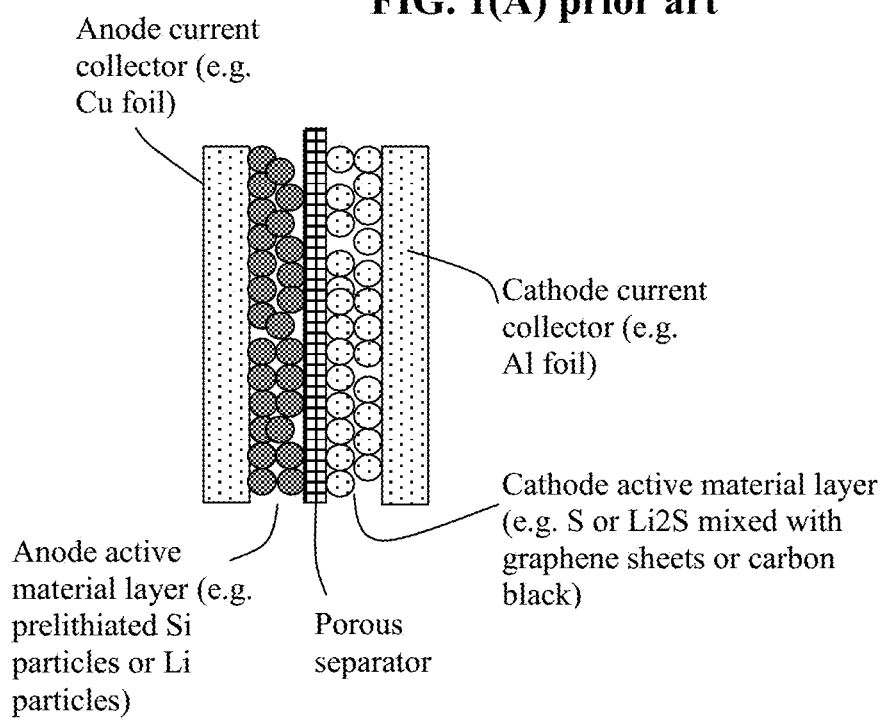
FIG. 1(B) Schematic of another prior art alkali metal-sulfur battery cell.

For convenience, the following discussion of preferred embodiments is primarily based on Li—S cells, but the same or similar composition, structure, and methods are applicable to Na—S and K—S cells. Examples are presented for Li—S cells, room-temperature Na—S cells, and K—S cells.

A. Alkali Metal-Sulfur Cells (Using Lithium-Sulfur Cells as an Example)

The specific capacity and specific energy of a Li—S cell (or Na—S, or K—S cell) are dictated by the actual amount of sulfur that can be implemented in the cathode active layer (relative to other non-active ingredients, such as the binder resin and conductive filler) and the utilization rate of this sulfur amount (i.e. the utilization efficiency of the cathode active material or the actual proportion of S that actively participates in storing and releasing lithium ions). Using Li—S cell as an illustrative example, a high-capacity and high-energy Li—S cell requires a high amount of S in the cathode active layer (i.e. relative to the amounts of non-active materials, such as the binder resin, conductive additive, and other modifying or supporting materials) and a high S utilization efficiency). The present invention provides such a cathode active layer, its constituent powder mass product, the resulting Li—S cell, and a method of producing such a cathode active layer and battery.

The alkali metal-sulfur cell comprises (a) an anode active material layer and an optional anode current collector supporting the anode active material layer; (b) a cathode active material layer and an optional cathode current collector supporting the cathode active material layer; and (c) an electrolyte with an optional porous separator layer in ionic contact with the anode active material layer and the cathode active material layer (separator is not required where a solid state electrolyte is used, for instance); wherein the cathode active material layer contains multiple particulates of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof and wherein at least one of the particulates is composed of one or a plurality of the sulfur-containing material particles being embraced or encapsulated by a thin layer of a high-elasticity polymer having a recoverable tensile strain no less than 2% when measured without an additive or reinforcement (but can contain a lithium salt or sodium salt and/or a liquid solvent), a lithium ion conductivity no less than $10^{-6}$ S/cm (typically from $10^{-5}$ S/cm to $5 \times 10^{-2}$ S/cm, measured at room temperature), and a thickness from 0.5 nm to 10 µm (typically from 1 nm to 1 µm, but preferably <100 nm and more preferably <10 nm).

This high-elasticity polymer contains a polyrotaxane network having a rotaxane structure or a polyrotaxane structure at a crosslink point of said polyrotaxane network. Preferably, the rotaxane structure or polyrotaxane structure is selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof. In certain embodiments, the polyrotaxane network contains a polymer selected from polyethylene glycol, polypropylene glycol, polyethylene oxide, polypropylene oxide, poly (succinic acid), an aliphatic polyester, or a combination thereof.

The sulfur-carbon hybrid, sulfur-graphite hybrid, sulfur-graphene hybrid, or conducting polymer-sulfur hybrid may be a mixture, blend, composite, or chemically or physically bonded entity of sulfur or sulfide with a carbon, graphite, graphene, or conducting polymer material. For instance, a sulfur-graphene hybrid can be a simple mixture (in a particle form) of sulfur and graphene prepared by ball-milling. Such a hybrid can contain sulfur bonded on surfaces of a graphene oxide sheet, etc. As another example, the sulfur-carbon hybrid can be a simple mixture (in a particle form) of sulfur and carbon nanotubes, or can contain sulfur residing in pores of activated carbon particles. In the instant cathode layer, these particles of sulfur hybrid are embraced by a high-elasticity polymer.

In the rechargeable alkali metal-sulfur cell, the metal sulfide may contain a material denoted by $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M preferably is selected from Li, Na, K, Mg, Zn, Cu, Ti, Ni, Co, Fe, or Al. In some preferred embodiments, the metal sulfide in the cathode layer contains $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S_1$, $K_2S_2$, $K_2S_3$, $K_2S_4$, $K_2S_5$, $K_2S_6$, $K_2S_7$, $K_2S_8$, $K_2S_9$, or $K_2S_{10}$.

In the rechargeable alkali metal-sulfur cell, the carbon or graphite material in the cathode active material layer may be selected from mesophase pitch, mesophase carbon, mesocarbon micro-bead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof. The graphene may be selected from pristine graphene, graphene oxide, reduced graphene oxide (RGO), graphene fluoride, nitrogenated graphene, hydrogenated graphene, doped graphene, functionalized graphene, or a combination thereof.

The conducting polymer-sulfur hybrid may preferably contain an intrinsically conductive polymer selected from polyaniline, polypyrrole, polythiophene, polyfuran, a bi-cyclic polymer, a sulfonated derivative thereof, or a combination thereof. This can be a simple mixture of sulfur or metal sulfide with a conducting polymer.

In certain embodiments, the high-elasticity polymer contains from 0.1% to 50% by weight of a lithium ion-, sodium ion-, or potassium ion-conducting additive dispersed therein, or contains therein from 0.1% by weight to 10% by weight of a reinforcement nanofilament selected from carbon nanotube, carbon nanofiber, graphene, or a combination thereof. The lithium ion-conducting additive to form a composite wherein the lithium ion-conducting additive is dispersed in the high-elasticity polymer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\le1$ and $1\le y\le4$.

The lithium ion-conducting additive may be dispersed in the high-elasticity polymer and may be selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof. The sodium ion- or potassium ion-conducting additive, dispersed in the UHMW polymer, may be selected from sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

High-elasticity polymer refers to a polymer which exhibits an elastic deformation that is at least 2% when measured under uniaxial tension (without an additive or reinforcement in the polymer, but can contain a lithium salt and/or liquid solvent dispersed in the polymer). In the field of materials science and engineering, the "elastic deformation" is defined as a deformation of a material (when being mechanically stressed) that is essentially fully recoverable and the recovery is essentially instantaneous upon release of the load. The elastic deformation is preferably greater than 5%, more preferably greater than 10%, further more preferably greater than 30%, still more preferably greater than 50%, and most preferably greater than 100%.

Figure 4:
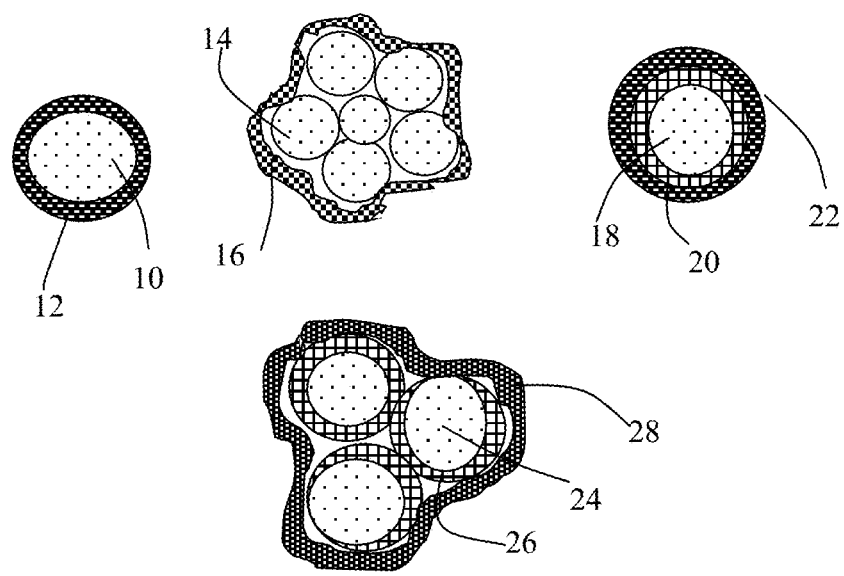
FIG. 4 Schematic of four types of high-elasticity polymer-embraced S-containing cathode active material particles.

As illustrated in FIG. 4, the present invention provides four major types of particulates of high-elasticity polymer-encapsulated cathode active material particles. The first one is a single-particle particulate containing a cathode active material core 10 (e.g. particle of a sulfur-CNT mixture) encapsulated by a high-elasticity polymer shell 12. The second is a multiple-particle particulate containing multiple cathode active material particles 14 (e.g. particles of sulfur-graphene mixture, sulfur-carbon black mixture, activated carbon particles having pores impregnated with S, lithium polysulfide particles, etc.), optionally along with other active materials (e.g. particles of graphite or hard carbon, not shown) or conductive additive, which are encapsulated by a high-elasticity polymer 16. The third is a single-particle particulate containing a cathode active material core 18 coated by a carbon or graphene layer 20 (or other conductive material) and further encapsulated by a high-elasticity polymer 22. The fourth is a multiple-particle particulate containing multiple cathode active material particles 24 coated with a conductive protection layer 26 (carbon, graphene, etc.), optionally along with other active materials (e.g. particles of graphite or hard carbon, not shown) or conductive additive, which are encapsulated by a high-elasticity polymer shell 28. These cathode active material particles can be based on sulfur compound, metal polysulfide, etc., instead of neat sulfur.

Figure 3:
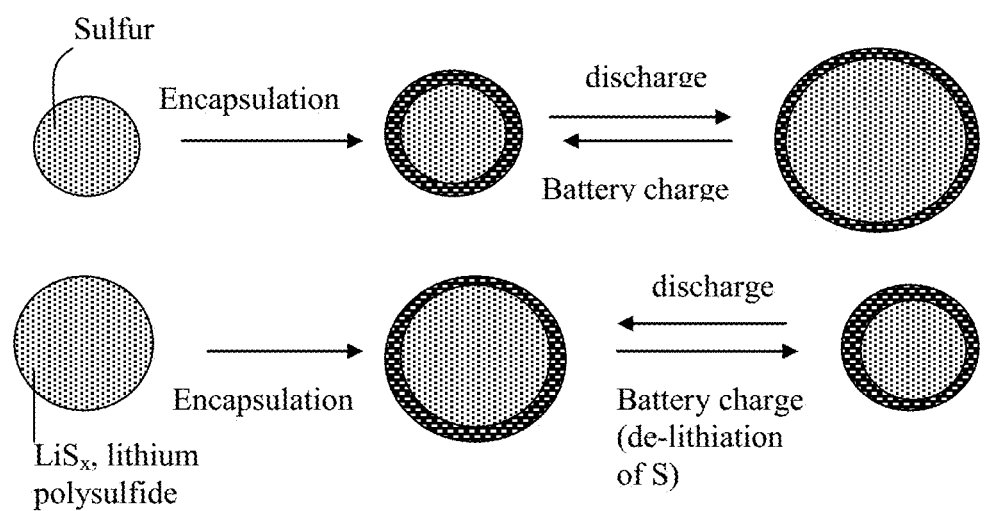
FIG. 3 Schematic of the presently invented high-elasticity polyrotaxane polymer-encapsulated particles of a sulfur cathode active material. The high elastic deformation of the polymer shell enables the shell to expand and contract congruently and conformingly with the core particle.

As schematically illustrated in the upper portion of FIG. 3, a sulfur-based particle can be encapsulated by a high-elasticity polymer shell to form a core-shell structure (sulfur core and polymer shell in this example). As the lithium-sulfur battery is discharged, the cathode active material (e.g. sulfur in the high-elasticity polymer-encapsulated S/CNT particle) reacts with lithium ions to form lithium polysulfide which expands in volume. Due to the high elasticity of the encapsulating shell (the high-elasticity polymer), the shell will not be broken into segments (in contrast to the broken carbon shell). That the high-elasticity polymer shell remains intact, preventing the exposure of the underlying lithium sulfide to electrolyte and, thus, preventing the lithium sulfide from dissolving in the electrolyte during repeated charges/discharges of the battery. This strategy prevents continuing migration of lithium polysulfide to the anode side where it reacts with lithium and is unable to return to the cathode (the shuttle effect). This shuttle effect is mainly responsible for continued capacity decay in a conventional Li—S, Na—S, or K—S cell.

Alternatively, referring to the lower portion of FIG. 3, lithium sulfide is used as the cathode active material. A layer of high-elasticity polymer may be encapsulated around the lithium polysulfide particle to form a core-shell structure. When the Li—S battery is charged and lithium ions are released from the cathode, the cathode active material particle contracts. However, the high-elasticity polymer is capable of elastically shrinking in a conformal manner; hence, leaving behind no gap between the protective shell and the sulfur. Such a configuration is amenable to subsequent lithium reaction with sulfur. The high-elasticity polymer shell expands and shrinks congruently with the expansion and shrinkage of the encapsulated core cathode active material particle, enabling long-term cycling stability of a Li—S or Na—S battery.

B. High-Elasticity Polymers

Preferably and typically, the high-capacity polymer has a lithium ion conductivity no less than $10^{-6}$ S/cm, more preferably no less than $10^{-4}$ S/cm, further preferably no less than $10^{-3}$ S/cm, and most preferably no less than $10^{-2}$ S/cm. In some embodiments, the high-elasticity polymer is a neat polyrotaxane network polymer having no additive or filler dispersed therein. In others, the high-elasticity polymer is a polymer matrix composite containing from 0.1% to 50% (preferably 1% to 35%) by weight of a lithium ion-conducting additive dispersed in a rotaxane polymer network-based polymer matrix material. The high-elasticity polymer must have a high elasticity (elastic deformation strain value >2%). An elastic deformation is a deformation that is fully recoverable and the recovery process is essentially instantaneous (no significant time delay). The high-elasticity polymer can exhibit an elastic deformation from 5% up to 1,500% (15 times of its original length), more typically from 10% to 1,000%, and further more typically from 30% to 300%.

It may be noted that although a metal or a plastic typically has a high ductility (i.e. can be extended to a large strain without breakage), the majority of the deformation is plastic deformation (non-recoverable) and only a small amount of elastic deformation (typically <1% and more typically <0.2%). Thus, a metal or a plastic does not qualify as a high-elasticity material.

In some preferred embodiments, the high-elasticity polymer contains a polyrotaxane network having a rotaxane structure or a polyrotaxane structure at the crosslink points of the polyrotaxane network. The rotaxane structure or polyrotaxane structure may be selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof. These network or cross-linked polymers exhibit a unique combination of a high elasticity (high elastic deformation strain) and high lithium-ion conductivity.

In certain embodiments, the polyrotaxane network contains a polymer selected from polyethylene glycol, polypropylene glycol, polyethylene oxide, polypropylene oxide, poly (succinic acid), an aliphatic polyester, or a combination thereof. These network or cross-linked polymers exhibit a unique combination of a high elasticity (high elastic deformation strain) and high lithium-ion conductivity.

A polyrotaxane network is a network polymer having a rotaxane or polyrotaxane structure at the crosslink points. A polyrotaxane typically contains many cyclic molecules that are threaded on a single polymer chain, which is trapped by capping the chain with bulky end groups. One example is a polyrotaxane consisting of α-cyclodextrin (α-CD) and poly (ethylene glycol) (PEG), wherein a PEG chain penetrates multiple α-CD rings, illustrated in Schematic A (FIG. 10(A)) as an example.

It is also possible to have multiple α-CD rings being cross-linked together (e.g. by cyanuric chloride) to form a 3D network of chains. In this network, the polymer chains with bulky end groups (e.g. bisamine) are neither covalently cross-linked nor do they form conventional physical entanglements. Instead, they are topologically interlocked by "figure-of-eight" cross-links, as illustrated in Schematic B (FIG. 10(B)). These cross-links can pass along the polymer chains freely to relax out the stress exerted on the threaded polymer chains just like pulleys. This topological network by figure-of-eight cross-links is herein referred to as a polyrotaxane (PR) network.

Furthermore, the α-CDs in the PR may be modified with polymerizable molecules (e.g. vinyl molecules), so that the PR derivative becomes a cross-linker for preparing complex 3D polymer networks, such as polymer gels. Molecules of α-CDs may also be modified with other multi-functionality molecules, such as —COOH and —OOCHN—R (R=methyl or other alkyl groups). The cyclodextrin (CD) may be a permethylated CD. The α-CDs in the PR may also be grafted with a polymer. For instance, poly(N-isopropyl acrylamide) (PNIPA) may be grafted from α-cyclodextrin of PR, via controlled radical polymerization. The terminal chlorinated alkyl group of the grafted PNIPA may then be modified with azide or alkyne. As a result, one obtains several types of PNIPA-grafted PR molecules with different terminations of PNIPA as building blocks to prepare 3D crosslinked network polymers having a high elasticity.

A simple and effective protocol has been developed to directly introduce rotaxane cross-links into vinyl polymers with a cross-linker, through the radical polymerization of the corresponding vinyl monomers [T. Arai, et al. "Versatile supramolecular cross-linker: a rotaxane cross-linker that directly endows vinyl polymers with movable cross-links," Chemistry 19, 5917-5923 (2013)]. This protocol for a rotaxane-crosslinked polymer (RCP) is achieved by transforming the cross-link structure of the cross-linker without requiring the pre-synthesis or cross-linking of polyrotaxane. The crosslinker is a CD-based vinylic supramolecular cross-linker (VSC) capable of facilitating the synthesis of polyrotaxane networks through radical polymerization of a vinyl monomer.

To prepare the VSC, an oligomacrocycle and a macromonomer with a bulky end-group are mixed to form a cross-linked inclusion complex through pseudo-rotaxanation. Successive radical polymerization of the vinyl monomer in the presence of VSC yields RCP possessing movable cross-links or movable polymer chains at the cross-link points. In this system, the pseudo-polyrotaxane network structure of the VSC is fixed into the polymer through copolymerization with the vinyl monomer.

Further, we have unexpectedly discovered that the presence of an amount of a lithium salt or sodium salt (1-35% by weight) and a liquid solvent (0-50%) can significantly increase the lithium-ion or sodium ion conductivity.

The first step for producing encapsulated active material particles is to dissolve a polymer or its precursor in a solvent to form a solution. Subsequently, particles of a cathode active material (e.g. sulfur-carbon hybrid particles, sulfur-graphite hybrid particles, sulfur-graphene hybrid particles, sulfur compound particles, metal sulfide particles, etc.) are dispersed in this polymer solution to form a suspension (dispersion or slurry) of an active material particle-polymer mixture. This suspension can then be subjected to a solvent removal treatment while individual particles remain substantially separated from one another. The polymer precipitates out to deposit on surfaces of these active material particles. This can be accomplished, for instance, via spray drying, ultrasonic spraying, air-assisted spraying, aerosolization, and other secondary particle formation procedures. The precursor is then cured or polymerized.

The high-elasticity polymer may form a mixture or blend with an electron-conducting polymer selected from polyaniline, polypyrrole, polythiophene, polyfuran, a bi-cyclic polymer, derivatives thereof (e.g. sulfonated versions), or a combination thereof.

In some embodiments, the high-elasticity polymer may form a mixture with a lithium ion-conducting polymer selected from regular molecular weight (<500,000 g/mole) version of poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a derivative thereof (e.g. sulfonated versions), or a combination thereof.

The rotaxane-based polymer may form a polymer blend with a conventional elastomer or rubber. Unsaturated rubbers that can be vulcanized to become elastomer include natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), Some elastomers are saturated rubbers that cannot be cured by sulfur vulcanization; they are made into a rubbery or elastomeric material via different means: e.g. by having a copolymer domain that holds other linear chains together. Each of these elastomers can be used to encapsulate particles of an anode active material by one of several means: melt mixing (followed by pelletizing and ball-milling, for instance), solution mixing (dissolving the anode active material particles in an uncured polymer, monomer, or oligomer, with or without an organic solvent) followed by drying (e.g. spray drying), interfacial polymerization, or in situ polymerization of elastomer in the presence of anode active material particles.

Saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, and protein elastin. Polyurethane and its copolymers (e.g. urea-urethane copolymer) are particularly useful elastomeric shell materials for encapsulating anode active material particles.

C. Encapsulation of Cathode Active Material Particles by a High-Elasticity Polymer Several micro-encapsulation processes require the high-elasticity polymer or its precursor (monomer or oligomer) to be dissolvable in a solvent. Fortunately, all the high-elasticity polymers or their precursors used herein are soluble in water or other common solvents. The polymer or its precursor can be readily dissolved in a common organic solvent to form a solution. This solution can then be used to encapsulate solid particles via several of the micro-encapsulation methods to be discussed in what follows. Upon encapsulation, the polymer shell is then polymerized, or the solvent is removed.

There are three broad categories of micro-encapsulation methods that can be implemented to produce high-elasticity polymer-encapsulated particles of a cathode active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-coating method: The pan coating process involves tumbling the active material particles in a pan or a similar device while the encapsulating material (e.g. monomer/oligomer, polymer melt, polymer/solvent solution) is applied slowly until a desired encapsulating shell thickness is attained.

Air-suspension coating method: In the air suspension coating process, the solid particles (core material) are dispersed into the supporting air stream in an encapsulating chamber. A controlled stream of a polymer-solvent solution (polymer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with a polymer or its precursor molecules while the volatile solvent is removed, leaving a very thin layer of polymer (or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Active material particles may be encapsulated using a rotating extrusion head containing concentric nozzles. In this process, a stream of core fluid (slurry containing particles of a material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle method: Core-shell encapsulation or matrix-encapsulation of an active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·S): emulsions, suspensions or slurry containing the active material. The solidification can be done according to the used gelation system with an internal gelation (e.g. sol-gel processing, melt) or an external (additional binder system, e.g. in a slurry).

Spray-drying: Spray drying may be used to encapsulate particles of an active material when the active material is dissolved or suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material.

Coacervation-phase separation: This process consists of three steps carried out under continuous agitation:
(a) Formation of three immiscible chemical phases: liquid manufacturing vehicle phase, core material phase and encapsulation material phase. The core material is dispersed in a solution of the encapsulating polymer (or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.
(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and
(c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form an elastomer shell material.

In-situ polymerization: In some micro-encapsulation processes, active materials particles are fully coated with a monomer or oligomer first. Then, direct polymerization and cross-linking of the monomer or oligomer is carried out on the surfaces of these material particles.

Matrix polymerization: This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

Figure 2:
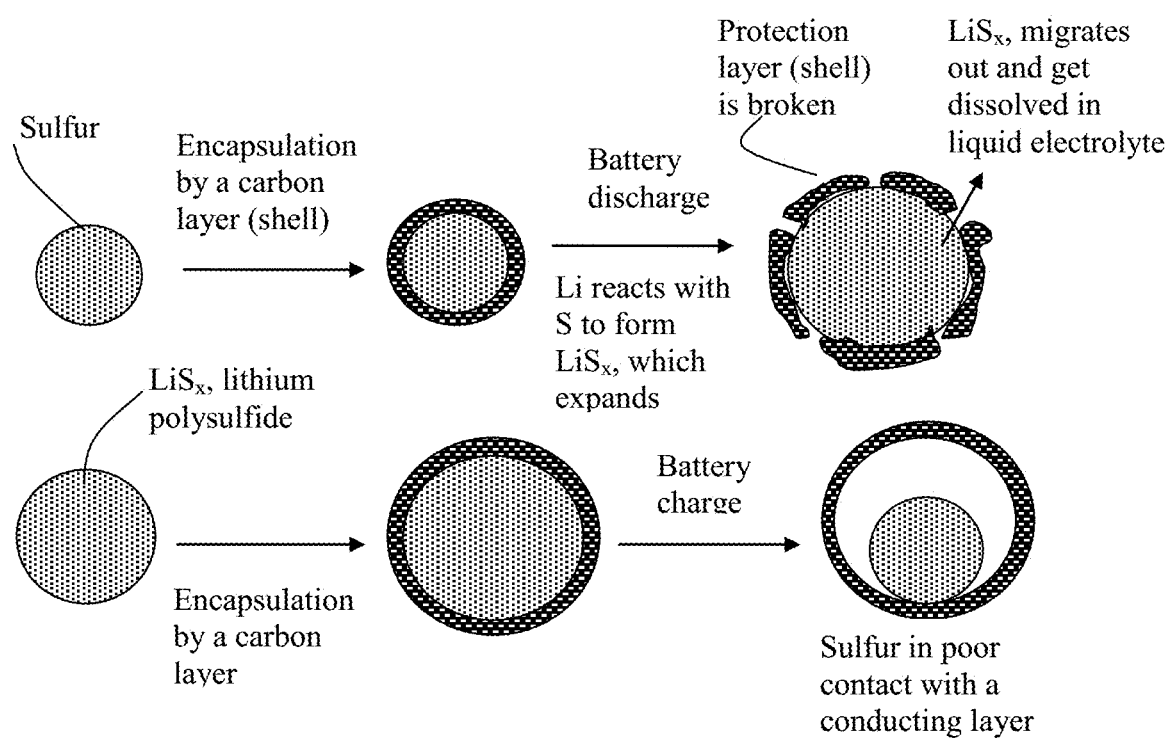
FIG. 2 The issues associated with the cathode active material of a prior art alkali metal battery; for instance, a metal sulfide particle encapsulated by a protective shell (e.g. carbon shell) in a core-shell structure inevitably leads to breakage of the shell and that a metal sulfide particle encapsulated with a protective layer leads to poor contact between the contracted metal sulfide particle and the rigid protective shell during battery charge.

D. Additional Details about the Encapsulated Particulates, the Cathode Layer, and the Structure of Li—S, Na—S, and K—S Cells The anode active material layer of an alkali metal-sulfur cell can contain a foil or coating of Li, Na, or K supported by a current collector (e.g. Cu foil), as illustrated in the left-hand portion of FIG. 1(A) for a prior art Li—S cell. Alternatively, the anode active material may contain, for instance, particles of pre-lithiated Si particles or surface-stabilized Li particles, as illustrated in the left-hand portion of FIG. 2(B). However, the cathode layer in the instant cell is distinct, as already discussed above.

The electrolyte for an alkali metal-sulfur cell may be an organic electrolyte, ionic liquid electrolyte, gel polymer electrolyte, solid-state electrolyte (e.g. polymer solid electrolyte or inorganic solid electrolyte), quasi-solid electrolyte or a combination thereof. The electrolyte typically contains an alkali metal salt (lithium salt, sodium salt, and/or potassium salt) dissolved in a solvent.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium [$LiN(CF_3SO_2)_2$], lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium (NaN($CF_3SO_2$)$_2$), sodium trifluoromethanesulfonimide (NaTFSI), and bis-trifluoromethyl sulfonylimide potassium ($KN(CF_3SO_2)_2$). Among them, $LiPF_6$, $LiBF_4$ and $LiN(CF_3SO_2)_2$ are preferred for Li—S cells, $NaPF_6$ and $LiBF_4$ for Na—S cells, and $KBF_4$ for K—S cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li—S cell.

In the presently invented products (including the alkali metal cell, the cathode active layer, and the cathode active material powder), the core material (to be encapsulated by a thin layer of high-elasticity polymer) contains the sulfur-carbon hybrid, sulfur-graphite hybrid, sulfur-graphene hybrid, conducting polymer-sulfur hybrid, metal sulfide, sulfur compound, etc. These hybrid or compound materials are produced in the form of particles that contain a mixture, blend, composite, or bonded entity of sulfur or sulfide with a carbon, graphite, graphene, or conducting polymer material. Metal sulfides (e.g. lithium polysulfide, sodium polysulfide, etc.) and sulfur compounds are readily available in a fine particle form. Sulfur can be combined with a conducting material (carbon, graphite, graphene, and/or conducting polymer) to form a composite, mixture, or bonded entity (e.g. sulfur bonded on graphene oxide surface).

There are many well-known procedures that can be used to make the aforementioned sulfur-containing materials into particles. For instance, one may mix solid sulfur with a carbon or graphite material to form composite particles using ball-milling. The resulting particles are typically ellipsoidal or potato-like in shape having a size from 1 to 20 μm. Also, one may infiltrate S or sulfide into the pores of porous carbon or graphite particles (e.g. activated carbon, mesoporous carbon, activated carbon fibers, etc.) using vapor phase infiltration, solution infiltration, chemical infiltration, or electrochemical infiltration. Alternatively, one may deposit sulfur onto surfaces of graphene sheets, CNTs, carbon nanofibers, etc. and then form these S-coated nano materials into a spherical or ellipsoidal shape using high-intensity ball-milling, spray-drying (of their suspensions), aerosol formation, etc. These particles are then encapsulated with a high-elasticity polymer using the micro-encapsulation processes discussed above.

The cathode in a conventional Li—S cell typically has less than 70% by weight of sulfur in a composite cathode composed of sulfur and the conductive additive/support. Even when the sulfur content in the prior art composite cathode reaches or exceeds 70% by weight, the specific capacity of the composite cathode is typically significantly lower than what is expected based on theoretical predictions.

For instance, the theoretical specific capacity of sulfur is 1,675 mAh/g. A composite cathode composed of 70% sulfur (S) and 30% carbon black (CB), without any binder, should be capable of storing up to 1,675×70%=1,172 mAh/g. Unfortunately, the observed specific capacity is typically less than 75% or 879 mAh/g (often less than 50% or 586 mAh/g in this example) of what could be achieved. In other words, the active material (S) utilization rate is typically less than 75% (or even <50%). This has been a major issue in the art of Li—S cells and there has been no solution to this problem.

Thus, it is highly advantageous to obtain a high sulfur loading and yet, concurrently, maintaining an ultra-thin/small thickness/diameter of sulfur for significantly enhanced sulfur utilization efficiency, energy density and power density. For instance, one can deposit nano-scaled sulfur (1-5 nm thick) on graphene surfaces using chemical, electrochemical, or vapor deposition to form S-coated or S-bonded graphene sheets. These S-coated or S-bonded graphene sheets are then aggregated together using a tumbling mixing, ball-milling, or spraying procedure. These steps enable the preparation of S-conducting material hybrids that contain 85%-99% by weight sulfur, yet maintaining a coating thickness or particle diameter from 1 nm to 5 nm. This ultra-small dimension enables fast lithium diffusion and lithium-sulfur reactions, leading to high S utilization efficiency (hence, high energy density) even at high charge-discharge rates. By implementing a high-elasticity polymer around these hybrid particles or sulfur compound/sulfide particles, we have significantly reduced and even eliminated the shuttling effect, resulting in an alkali metal battery that has long cycle-life.

Again, the shuttling effect is related to the tendency for sulfur or alkali metal polysulfide that forms at the cathode to get dissolved in the solvent and for the dissolved lithium polysulfide species to migrate from the cathode to the anode, where they irreversibly react with lithium to form species that prevent sulfide from returning back to the cathode during the subsequent discharge operation of the Li—S cell (the detrimental shuttling effect). It appears that the embracing high-elasticity polymer has effectively trapped sulfur and metal polysulfide therein, thereby preventing or reducing such a dissolution and migration issue. We have solved the most critical, long-standing problem of alkali metal-sulfur batteries.

This cathode active material layer may further comprise a binder resin that bonds the multiple particulates (of encapsulated sulfur-containing particles) together to form the cathode active material layer. In the aforementioned cathode active material layer, the binder resin is not part of the multiple particulates (i.e. not included inside the core portion of a particulate) and is external to the multiple particulates. The high-elasticity polymer does not embrace the binder resin and the binder resin is not embedded in the high-elasticity polymer. The binder resin does not embrace the particulate as well.

In an alternative structure, the cathode may contain an active material layer that is protected (covered) by a separate layer of a high-elasticity polymer. The active material layer may contain a resin binder, an optional conductive additive, and multiple particles of a sulfur-containing material, wherein the binder resin helps to bond the sulfur-containing particles together to form a solid cathode layer of structural integrity. This solid cathode layer may be supported by a cathode current collector (e.g. Al foil). Most significantly, this solid cathode layer is covered and protected by a layer of high-elasticity polymer, which is disposed between the solid cathode layer and the porous separator.

In this solid active layer, the sulfur-containing material is selected from a sulfur-carbon hybrid, sulfur-graphite hybrid, sulfur-graphene hybrid, conducting polymer-sulfur hybrid, metal sulfide, sulfur compound, or a combination thereof. Again, and more specifically, the sulfur-containing material particles are bonded by the resin binder to form an integral solid cathode layer (a layer of adequate structural integrity so that it can be freely-standing), and the integral solid active layer is covered and protected by a thin layer of a high-elasticity polymer having a recoverable tensile strain no less than 2% when measured without an additive or reinforcement, a lithium ion conductivity no less than $10^{-6}$ S/cm at room temperature, and a thickness from 0.5 nm to 10 μm. The integral solid layer may be bonded by the resin binder to a cathode current collector.

Such a high-elasticity polymer protective layer can be formed by spraying the precursor solution (polymer or its precursor monomers/oligomers) dissolved in a liquid solvent) over a pre-made cathode active material layer and then removing the solvent. This is followed by curing or polymerization of the precursor, if present.

The invention also provides a rechargeable alkali metal-sulfur cell that contains such a cathode active material layer, wherein the entire layer is covered and protected by a high-elasticity polymer. This alkali metal-sulfur cell comprises: (a) an anode active material layer and an optional anode current collector supporting the anode active material layer; (b) a cathode that contains this cathode active material layer; and (c) an electrolyte with a porous separator layer in ionic contact with the anode active material layer and the cathode active material layer. Effectively, this high-elasticity polymer protective layer is implemented between the cathode active layer and the porous separator.

In all versions of the above-discussed alkali metal-sulfur cells, the anode active material may contain, as an example, lithium metal foil (or powder) or a high-capacity Si, Sn, or $SnO_2$ capable of storing a great amount of lithium. The cathode active material may contain pure sulfur (if the anode active material contains lithium), lithium polysulfide, or any sulfur containing compound, molecule, or polymer. If the cathode active material includes lithium-containing species (e.g. lithium polysulfide) when the cell is made, the anode active material can be any material capable of storing a large amount of lithium (e.g. Si, Ge, Sn, $SnO_2$, etc.).

At the anode side, when lithium metal is used as the sole anode active material in a Li—S cell, there is concern about the formation of lithium dendrites, which could lead to internal shorting and thermal runaway. Herein, we have used two approaches, separately or in combination, to address this dendrite formation issue: one involving the use of a high-concentration electrolyte at the anode side and the other the use of a nano-structure composed of conductive nanofilaments. For the latter, multiple conductive nanofilaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nanofilament may be selected from, as examples, a carbon nanofiber (CNF), graphite nanofiber (GNF), carbon nanotube (CNT), metal nanowire (MNW), conductive nanofibers obtained by electro-spinning, conductive electro-spun composite nanofibers, nano-scaled graphene platelet (NGP), or a combination thereof. The nanofilaments may be bonded by a binder material selected from a polymer, coal tar pitch, petroleum pitch, mesophase pitch, coke, or a derivative thereof.

Nanofibers may be selected from the group consisting of an electrically conductive electro-spun polymer fiber, electro-spun polymer nanocomposite fiber comprising a conductive filler, carbon nanofiber obtained from carbonization of an electro-spun polymer fiber, electro-spun pitch fiber, and combinations thereof. For instance, a nanostructured electrode can be obtained by electro-spinning of polyacrylonitrile (PAN) into polymer nanofibers, followed by carbonization of PAN. It may be noted that some of the pores in the structure, as carbonized, are greater than 100 nm and some smaller than 100 nm.

The presently invented cathode active layer may be incorporated in one of at least four broad classes of rechargeable lithium metal cells (or, similarly, for sodium metal or potassium metal cells):

(A) Lithium metal-sulfur with a conventional anode configuration: The cell contains an optional cathode current collector, a presently invented cathode layer, a separator/electrolyte, and an anode current collector. Potential dendrite formation may be overcome by using a high-concentration electrolyte or solid-state electrolyte at the anode.

(B) Lithium metal-sulfur cell with a nanostructured anode configuration: The cell contains an optional cathode current collector, a cathode herein invented, a separator/electrolyte, an optional anode current collector, and a nano-structure to accommodate lithium metal that is deposited back to the anode during a charge or re-charge operation. This nano-structure (web, mat, or paper) of nanofilaments provide a uniform electric field enabling uniform Li metal deposition, reducing the propensity to form dendrites. This configuration can provide a dendrite-free cell for a long and safe cycling behavior.

(C) Lithium ion-sulfur cell with a conventional anode: For instance, the cell contains an anode composed of anode active graphite particles bonded by a binder, such as polyvinylidene fluoride (PVDF) or styrene-butadiene rubber (SBR). The cell also contains a cathode current collector, a cathode of the instant invention, a separator/electrolyte, and an anode current collector; and (D) Lithium ion-sulfur cell with a nanostructured anode: For instance, the cell contains a web of nanofibers coated with Si coating or bonded with Si nanoparticles. The cell also contains an optional cathode current collector, a cathode herein invented, a separator/electrolyte, and an anode current collector. This configuration provides an ultra-high capacity, high energy density, and a safe and long cycle life.

In the lithium-ion sulfur cell (e.g. as described in (C) and (D) above), the anode active material can be selected from a wide range of high-capacity materials, including (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof. Non-lithiated versions may be used if the cathode side contains lithium polysulfides or other lithium sources when the cell is made.

A possible lithium metal cell may be comprised of an anode current collector, an electrolyte phase (optionally but preferably supported by a porous separator, such as a porous polyethylene-polypropylene co-polymer film), a cathode of the instant invention, and an optional cathode collector.

For a sodium ion-sulfur cell or potassium ion-sulfur cell, the anode active material layer can contain an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof (pre-doped or pre-loaded with Na), and combinations thereof.

Example 1: Mixing of Sulfur with Carbon/Graphite Particles Via Ball-Milling to Form Sulfur-Containing Particles Sulfur and lithium polysulfide particles and particles of soft carbon (i.e. graphitizable disordered carbon), natural graphite, mesophase carbon, expanded graphite flakes, carbon nanofibers, and graphene sheets (50% to 85% by weight of S in the resulting composite or hybrid) were physically blended and then subjected to ball milling for 2-24 hours to obtain S-containing composite particles (typically in a ball or potato shape). The particles, having a typical size of 1-10 containing various S contents, were then embraced with a thin layer of high-elasticity polymer (to be further described later). Some of the resulting particulates were then made into a layer of cathode.

Example 2: Simple Sulfur Melt or Liquid Solution Mixing

One way to combine sulfur with a conducting material (e.g. carbon/graphite particles) is to use a solution or melt mixing process. Highly porous activated carbon particles, chemically etched meso-carbon micro-balls (activated MCMBs), and exfoliated graphite worms were mixed with sulfur melt at 117-120° C. (slightly above the melting point of S, 115.2° C.) for 10-60 minutes to obtain sulfur-impregnated carbon particles.

Example 3: Preparation of Sulfur-Coated Graphene Sheets and their Secondary Particles (Particulates)

The step involves producing vapor of elemental sulfur, allowing deposition of S vapor on surfaces of single-layer or few-layer graphene sheets. The graphene sheets, suspended in a liquid medium (e.g. graphene oxide in water or graphene in NMP), were sprayed onto a substrate (e.g. glass surface) to form a thin layer of graphene sheets. This thin layer of graphene was then exposed to sublimation-generated physical vapor deposition. Sublimation of solid sulfur occurs at a temperature greater than 40° C., but a significant and practically useful sublimation rate typically does not occur until the temperature is above 100° C. We typically used 117-160° C. with a vapor deposition time of 10-120 minutes to deposit a thin film of sulfur on graphene surface (sulfur thickness being approximately from 1 nm to 10 nm). This thin layer of graphene having a thin film of sulfur deposited thereon was then easily broken into pieces of S-coated graphene sheets using an air jet mill. Some of these S-coated graphene sheets were directly embraced with a high-elasticity polymer. Some of these sheets were made into secondary particles of approximately 5-15 μm in diameter (e.g. via spray-drying) and then encapsulated by the high-elasticity polymer.

Example 4: Electrochemical Impregnation of S in Various Porous Carbon/Graphite Particles The electrochemical impregnation of S into pores of activated carbon fibers, activated carbon nanotubes, and activated artificial graphite particles was conducted by aggregating these particles/fibers into a loosely packed layer. In this approach, an anode, electrolyte, and a layer of such a loosely packed structure (serving as a cathode layer) are positioned in an external container outside of a lithium-sulfur cell. The needed apparatus is similar to an electroplating system, which is well-known in the art.

In a typical procedure, a metal polysulfide ($M_xS_y$) was dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polysulfide in this desired solvent. A greater solubility would mean a larger amount of sulfur can be derived from the electrolyte solution.

The electrolyte solution was then poured into a chamber or reactor under a dry and controlled atmosphere condition (e.g. He or nitrogen gas). A metal foil was used as the anode and a layer of the porous structure as the cathode; both being immersed in the electrolyte solution. This configuration constitutes an electrochemical impregnation and deposition system. The step of electrochemically impregnating sulfur into pores was conducted at a current density in the range of 1 mA/g to 10 A/g, based on the layer weight of the porous carbon/graphite particles/fibers.

The chemical reactions that occur in this reactor may be represented by the following equation: $M_xS_y \rightarrow M_xS_{y-z}+zS$ (typically z=1-4). The sulfur coating thickness or particle diameter and the amount of S coating/particles impregnated may be controlled by the electrochemical reaction current density, temperature and time. In general, a lower current density and lower reaction temperature lead to a more uniform impregnation of S and the reactions are easier to control. A longer reaction time leads to a larger amount of S saturated in the pores. Additionally, the electrochemical method is capable of rapidly converting the impregnated S into metal polysulfide (lithium polysulfide, sodium polysulfide, and potassium polysulfide, etc.).

Example 5: Chemical Reaction-Induced Impregnation of Sulfur

A chemical impregnation method was herein utilized to prepare S-impregnated carbon fibers that have been chemically activated. The procedure began with adding 0.58 g $Na_2S$ into a flask that had been filled with 25 ml distilled water to form a $Na_2S$ solution. Then, 0.72 g elemental S was suspended in the $Na_2S$ solution and stirred with a magnetic stirrer for about 2 hours at room temperature. The color of the solution changed slowly to orange-yellow as the sulfur dissolved. After dissolution of the sulfur, a sodium polysulfide ($Na_2S_x$) solution was obtained (where x=4 to 10).

Subsequently, a sulfur-impregnated carbon fiber sample was prepared by a chemical impregnation method in an aqueous solution. First, 180 mg of expansion-treated carbon fibers was suspended in 180 ml ultrapure water with a surfactant and then sonicated at 50° C. for 5 hours to form a stable carbon fiber dispersion. Subsequently, the $Na_2S_x$ solution was added to the above-prepared dispersions in the presence of 5 wt % surfactant cetyl trimethyl-ammonium bromide (CTAB), the as-prepared carbon fiber/$Na_2S_x$ blended solution was sonicated for another 2 hours and then titrated into 100 ml of 2 mol/L HCOOH solution at a rate of 30-40 drops/min and stirred for 2 hours. Finally, the precipitate was filtered and washed with acetone and distilled water several times to eliminate salts and impurities. After filtration, the precipitate was dried at 50° C. in a drying oven for 48 hours. The reaction may be represented by the following reaction: $S_x^{2-}+2H^+ \rightarrow (x-1) S+H_2S$.

Example 6: Redox Chemical Reaction-Induced Impregnation of Sulfur in Activated MCMBs and Activated Needle Coke In this chemical reaction-based deposition process, sodium thiosulfate ($Na_2S_2O_3$) was used as a sulfur source and HCl as a reactant. An activated MCMB-water or activated needle coke-water suspension was prepared and then the two reactants (HCl and $Na_2S_2O_3$) were poured into this suspension. The reaction was allowed to proceed at 25-75° C. for 1-3 hours, leading to impregnation of S into pores of the activated structures. The reaction may be represented by the following reaction: $2HCl+Na_2S_2O_3 \rightarrow 2NaCl+S\downarrow+SO_2\uparrow+H_2O$.

Example 7: Cathode Active Material Layers Containing High-Elasticity Polymer-Encapsulated Sulfur-Carbon/Graphite/Graphene Particles Selected amounts of sulfur-carbon, sulfur-graphite, and sulfur-graphene hybrid/composite particles were then each made into polyrotaxane-based high-elasticity polymer-encapsulated particulates according to the following procedure:

Preparation of polyrotaxane was conducted in the following manner: In an example, polyethylene glycol-bisamine (PEG-BA, 0.9 g) and α-CD (3.6 g) were dissolved in water (30 mL) at 80° C. and kept at 5° C. overnight to yield the white paste of the inclusion complex. Then, the paste was dried and added with an excess of 2,4-dinitrofluorobenzene (2.4 mL) together with dimethylformamide (10 mL) and then the mixture was stirred in a nitrogen atmosphere at room temperature overnight. The reaction mixture was dissolved in DMSO (50 mL) and precipitated from a 0.1% sodium chloride aqueous solution (800 mL) twice to give a yellow product. The product was collected, washed with water and methanol (three times, respectively), and dried to produce the polyrotaxane (1.25 g).

The polyrotaxane (100 mg) was dissolved in 1 N NaOH (0.5 mL) at 5° C. The hydroxyl groups of α-CD were ionized under a strong base, which resulted in Coulombic repulsion between adjacent CDs in the polyrotaxane. In one case, approximately one (1) gram of sulfur/CNT hybrid particles was mixed into this solution to form a suspension. Cyanuric chloride (35 mg), dissolved in 1 N NaOH (0.5 mL), was mixed with the solution to initiate the cross-linking reaction in the resulting slurry. The slurry was then quickly submitted to spray-drying to produce polymer-encapsulated S/CNT particles. The cross-linking reaction continued. After 3 h at room temperature, a product containing yellow polyrotaxane gel-encapsulated hybrid particles was obtained. The polymer shell thickness was varied from 2.3 nm to 33 nm by varying the polymer-to-S/CNT ratio.

On a separate basis, some amount of the polyrotaxane precursor solution (without sulfur cathode active particles) was cast onto a glass surface to form a wet film, which was thermally dried and then cross-linked at 60° C. for 30 min to form a film of cross-linked polymer. Some of the cure polymer samples were subjected to dynamic mechanical testing to obtain the equilibrium dynamic modulus, Ge, for the determination of the number average molecular weight between two cross-link points (Mc) and the corresponding number of repeat units (Nc), as a means of characterizing the degree of cross-linking.

In the above procedure, two routes were followed to prepare polymer-encapsulated hybrid particles. In the first route, hybrid particles were dispersed in the polymer solution to form a slurry. In some samples, 0.5%-5% of a conductive filler (e.g. graphene sheets or CNTs) was added into the slurry. The slurries were separately spray-dried to form particulates of polymer-encapsulated hybrid particles.

In the second route, 1-45% of lithium salt ($LiClO_4$) was dissolved in the solution to form a series of lithium-salt containing solutions. Then, hybrid particles were dispersed in the lithium-containing polymer solution to form a series of slurries. In some samples, 0.5%-5% of a conductive filler (e.g. graphene sheets) was added into the slurry. Each slurry was spray-dried to form particulates of polymer- or polymer/lithium salt-encapsulated hybrid particles. The polymer or polymer/lithium salt shell can contain some conducting material.

Some of the particulate samples were subsequently soaked in a solvent (preferably a desired lithium-ion battery electrolyte solvent such as ethylene carbonate, EC), allowing the solvent to permeate into the amorphous zones of the polymer phase embracing the hybrid particles. The network polymer shell thickness was varied from 21 nm to 1.05 µm.

Polymer solution was also cast onto glass surface and dried to form polymer films. Upon thorough drying, the polymer films were soaked in a desired solvent (e.g. EC) to form a rubber-like polymer. Several tensile testing specimens were cut from each polymer film containing a solvent (e.g. EC) and tested with a universal testing machine.

Figure 5A:
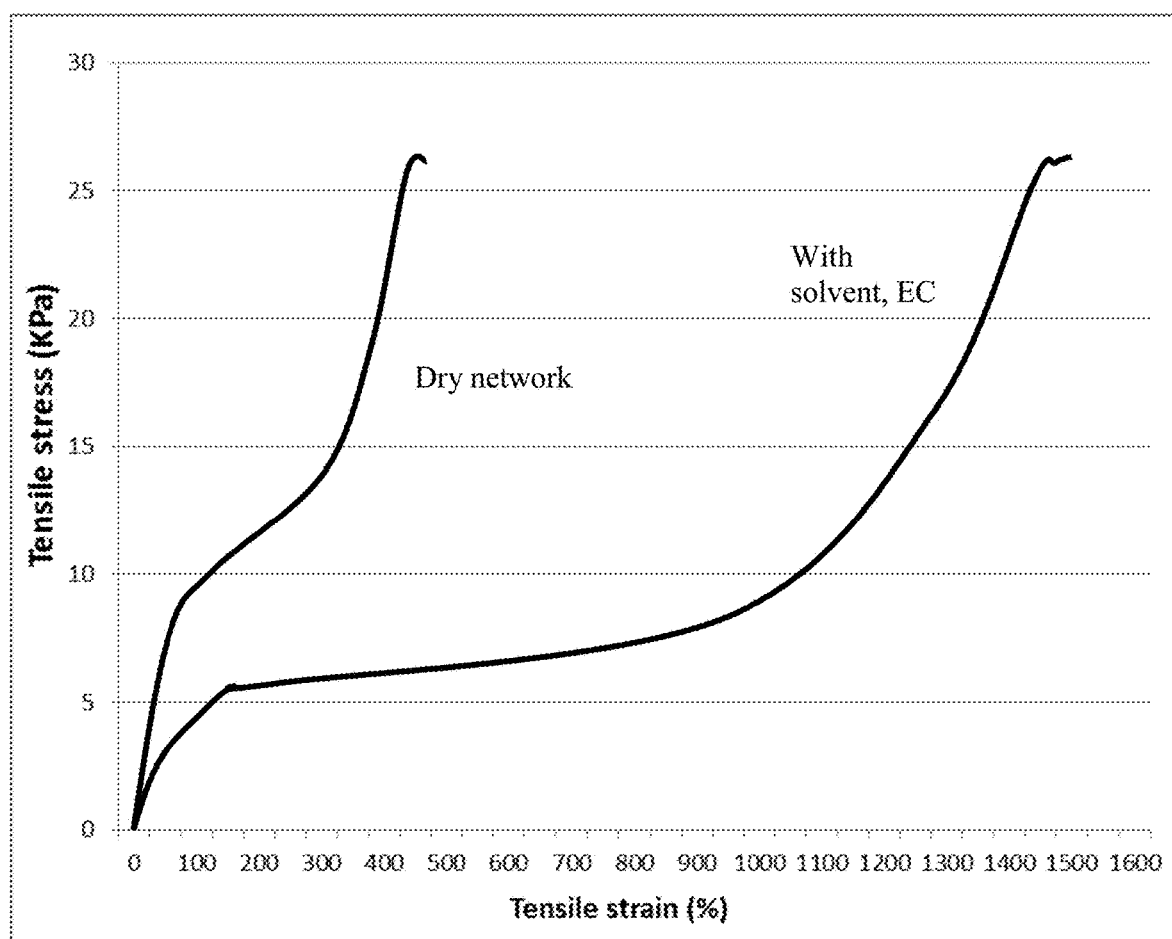
FIG. 5(A) Representative tensile stress-strain curves of a rotaxane network polymer with or without an organic solvent impregnated into the network of chains.

Several tensile testing specimens were cut from each cross-link film and tested with a universal testing machine. The representative tensile stress-strain curves of two polymers are shown in FIG. 5(A), which indicate that this series of network polymers have an elastic deformation from approximately 460% (dry network) to 1,490% (swollen with an organic solvent, EC). These above are for neat polymers without any additive. The addition of up to 30% by weight of a lithium salt typically reduces this elasticity down to a reversible tensile strain from 10% to 100%.

Several series of Li metal-sulfur and Li-ion sulfur cells were prepared using the presently prepared cathode layers. The first series is a Li metal cell containing a copper foil as an anode current collector and the second series is also a Li metal cell having a nanostructured anode of conductive filaments (based on electro-spun carbon fibers or CNFs). The third series is a Li-ion cell having a nanostructured anode of conductive filaments (based on electro-spun carbon fibers coated with a thin layer of Si using CVD) plus a copper foil current collector. The fourth series is a Li-ion cell having a pre-lithiated graphite-based anode active material as an example of the more conventional anode. We have found that after large numbers of charge/discharge cycles, the cells containing a nanostructured anode were essentially dendrite-free.

Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM).

Figure 5B:
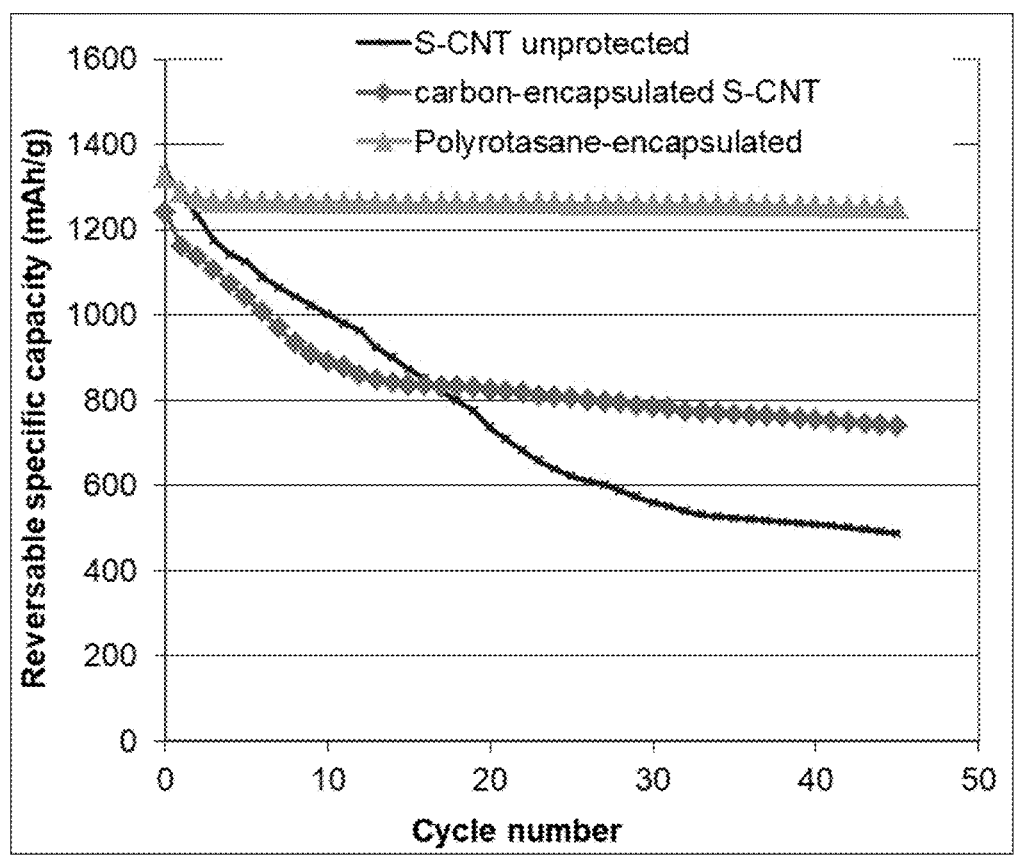
FIG. 5(B) The cathode specific capacity values of three Li—S battery having a cathode active material based on a S/CNT hybrid featuring (1) rotaxane network polymer-encapsulated S/CNT hybrid particles, (2) carbon-encapsulated C/CNT hybrid particles, and (3) un-protected S/CNT hybrid particles, respectively.

The cycling behaviors of 3 cells are shown in FIG. 5(B), which indicates that high-elasticity polyrotaxane network encapsulation of S/CNT particles provides the most stable cycling response. Carbon coating alone does not help to improve cycling stability by much.

In an additional experiment, a thin film of such a rotaxane network polymer (1 nm-10 µm) was implemented between a porous separator and a cathode active material layer containing non-encapsulated carbon-coated particles. This strategy also provides a more stable cycling behavior for a Li—S cell as compared with a cell without such a discrete protective layer.

Example 8: Graphene/Sulfur Particles Encapsulated by a Rotaxane Network Polymer

The high-elasticity polymer for encapsulation of graphene/sulfur particles was based on another rotaxane network polymer obtained by following a procedure similar to that suggested by Arai, et a. [T. Arai, et al. "Versatile supramolecular cross-linker: a rotaxane cross-linker that directly endows vinyl polymers with movable cross-links," Chemistry 19, 5917-5923 (2013)]. First, CD-based vinylic supramolecular cross-linker (VSC) was prepared by following the procedure described below: An oligomacrocycle and a macromonomer, two constituents of VSCs, were prepared from commercially available starting materials. Oligocyclodextrin (OCD) as the oligomacrocycle was obtained by the controlled reaction of α-cyclodextrin (α-CD) with a polymer diisocyanate derived from polypropylene glycol and tolylene diisocyanate (Scheme C).

(Schematic C)

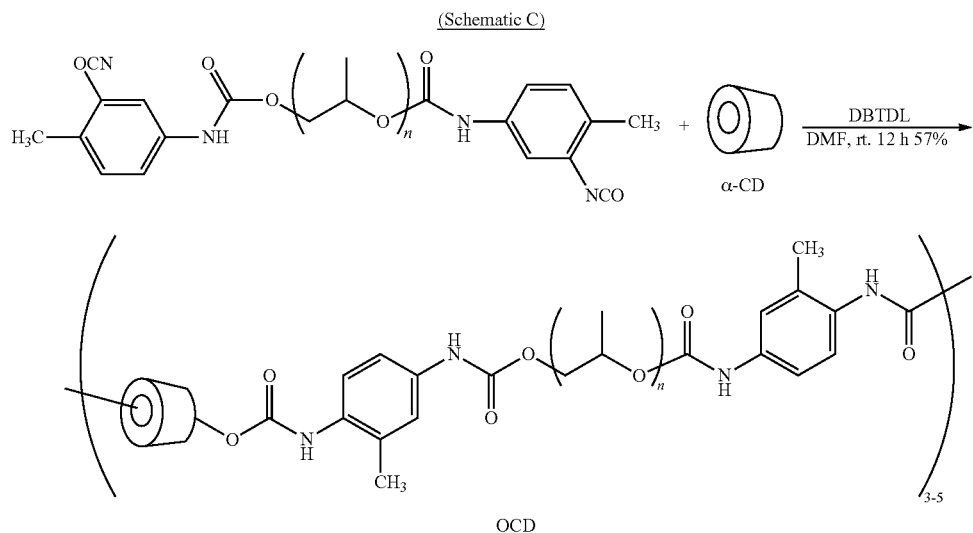

The average number of α-CD per OCD molecule was 4, as calculated from the results of the size-exclusion chromatography (SEC) profile of acetylated OCD (Mw 8000, polydispersity index (PDI) 1.6), which was prepared by using acetic anhydride in pyridine. The macromonomer, a terminal bulky end-tethering polyethylene glycol-type methacrylate (TBM), was prepared by the reaction of a hydroxyl-terminated PEG based macromonomer with 3,5-dimethylphenyl isocyanate (Schematic D).

(Schematic D)

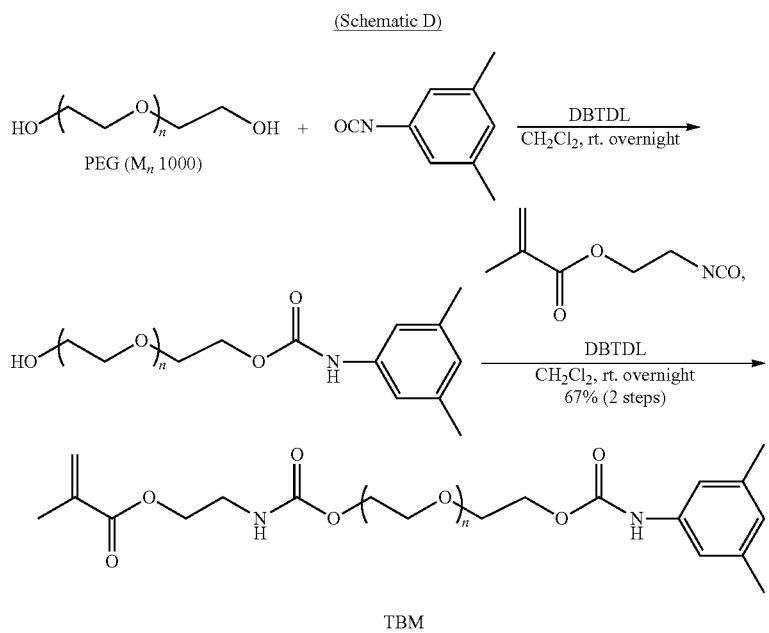

TBM

OCD and TBM were mixed in alkaline water (0.1M NaOH), and the mixture was sonicated for 5 min at room temperature to produce a white viscous gel (VSC).

A mixture of N,N-dimethyl-acrylamide (DMAAm, 2.0 g) as a typical vinyl monomer, 50 grams of graphene/S hybrid particles, VSC (0.30 g, 15 wt %), and the photoinitiator (Irgacure-500, 1 wt %) were UV irradiated in water at room temperature for 3 min to produce a gelled product (84%, RCP-DMAAm) coated on graphene/S particle surfaces as a thin transparent film.

Figure 6A:
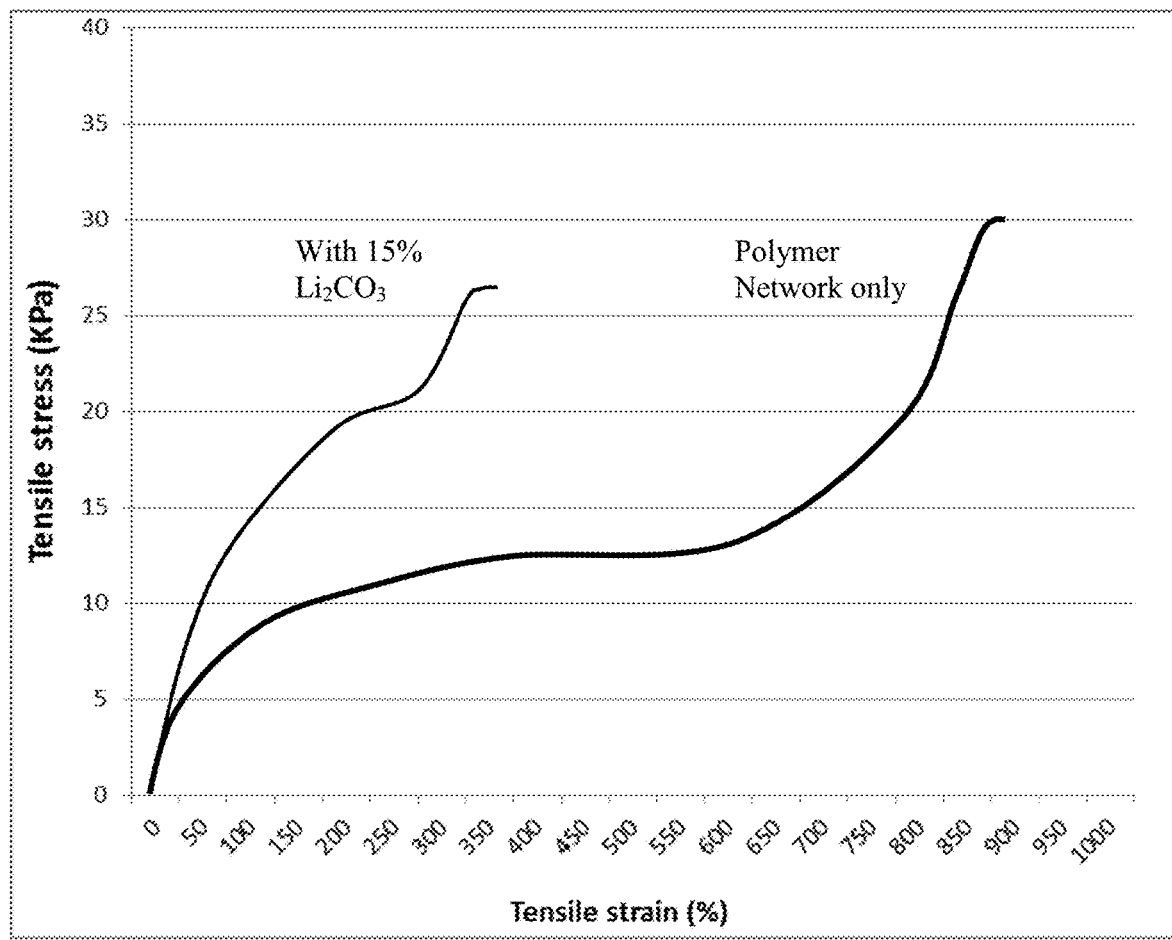
FIG. 6(A) Representative tensile stress-strain curve of a polyrotaxane network polymer with or without a lithium salt dispersed therein.

Tensile testing was also conducted on the polymer network films (without hybrid cathode particles) and some testing results are summarized in FIG. 6(a). This series of cross-linked polymers can be elastically stretched up to approximately 355% (having some lithium salt dispersed therein) or up to 950% (with no additive).

Figure 6B:
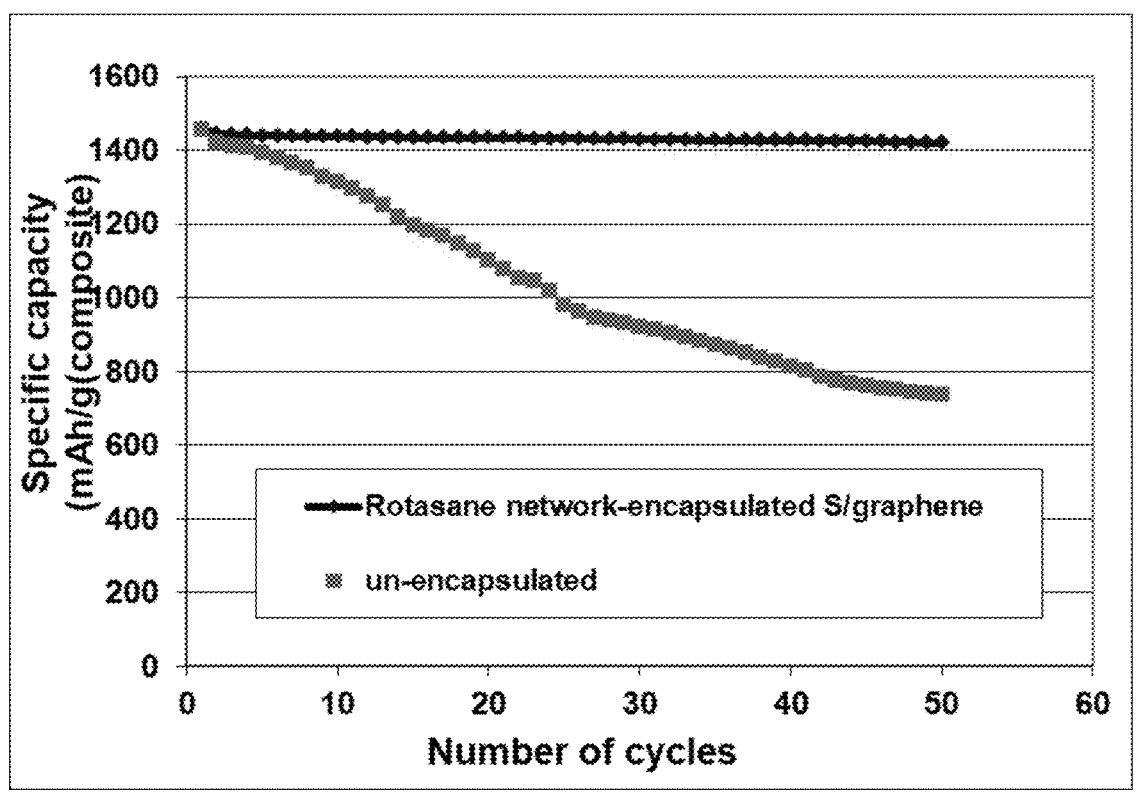
FIG. 6(B) The cathode specific capacity values of two Li—S batteries having a cathode active material layer featuring (1) high-elasticity polymer-encapsulated S/graphene hybrid particles and (2) un-protected S/graphene hybrid particles, respectively.

Shown in FIG. 6(B) are the cycling behaviors of 2 Li—S cells; one cell has a cathode containing particulates of rotaxane network-encapsulated sulfur-graphene composite balls and the other cell has a cathode containing particulates of un-protected sulfur-graphene composite balls. The high-elasticity polymer has imparted cycle stability to the Li—S cell in a most dramatic manner.

Figure 7:
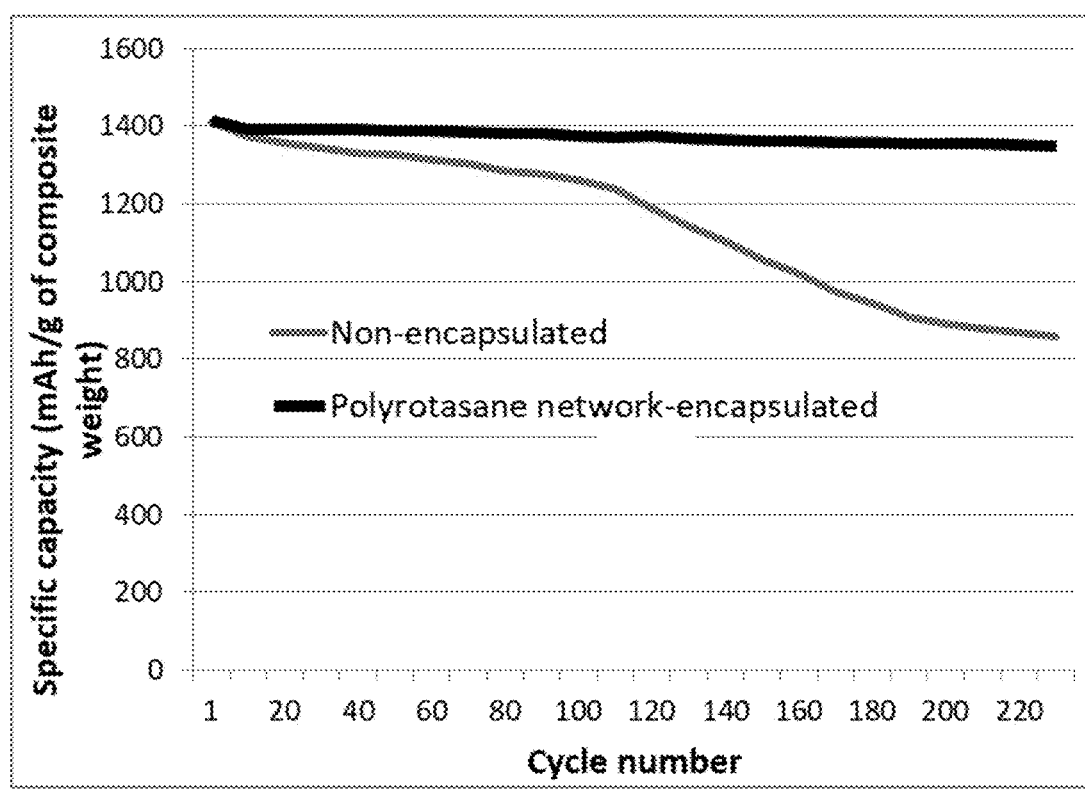
FIG. 7 The cathode specific capacity values of two Na—S cells having a cathode active material layer featuring (1) high-elasticity polyrotaxane-encapsulated sulfur-MCMB (activated) composite particles; and (2) un-protected sulfur-MCMB (activated) composite particles, respectively.

Example 9: Sulfur-Impregnated Activated MCMB Particles Encapsulated by a Rotaxane Network FIG. 7 shows the cycling behavior of two room-temperature Na—S cell: one cell has a cathode containing particulates of rotaxane polymer-encapsulated sulfur-MCMB (activated) composite particles and the other cell has a cathode containing particulates of un-protected sulfur-MCMB (activated) composite particles. Again, the high-elasticity polymer has significantly improved the cycle stability to the Na—S cell.

The above cycling stability data have clearly demonstrated that the shuttling effect commonly associated with Li—S or Na—S cells has been significantly reduced or essentially eliminated by the presently invented rotaxane-based high-elasticity polymer encapsulation approach.

Example 10: Effect of Lithium Ion-Conducting Additive in a High-Elasticity Polymer A wide variety of lithium ion-conducting additives were added to several different rotaxane polymer networks to prepare encapsulation shell materials for protecting core particles of S cathode active materials. We have discovered that these rotaxane polymer composite materials are suitable encapsulation shell materials provided that their lithium ion conductivity at room temperature is no less than $10^{-6}$ S/cm. With these materials, lithium ions appear to be capable of readily diffusing in and out of the encapsulation shell having a thickness no greater than 1 μm. For thicker shells (e.g. 10 μm), a lithium ion conductivity at room temperature no less than $10^{-4}$ S/cm would be required.

TABLE 1

Lithium ion conductivity of various high-elasticity polymer composite compositions as a shell material for protecting S cathode active materials.

| Sample No. | Lithium-conducting additive | % Rotaxane polymer network (1-2 μm thick) | Li-ion conductivity (S/cm) |
|---|---|---|---|
| E-1p | $Li_2CO_3 + (CH_2OCO_2Li)_2$ | 70-99% | $1.5 \times 10^{-4}$ to $3.6 \times 10^{-3}$ S/cm |
| B1p | $LiF + LiOH + Li_2C_2O_4$ | 60-90% | $4.5 \times 10^{-5}$ to $2.8 \times 10^{-3}$ S/cm |
| B2p | $LiF + HCOLi$ | 80-99% | $1.1 \times 10^{-4}$ to $1.3 \times 10^{-3}$ S/cm |
| B3p | $LiOH$ | 70-99% | $8.9 \times 10^{-4}$ to $1.2 \times 10^{-2}$ S/cm |
| B4p | $Li_2CO_3$ | 70-99% | $4.1 \times 10^{-3}$ to $9.2 \times 10^{-3}$ S/cm |
| B5p | $Li_2C_2O_4$ | 70-99% | $8.4 \times 10^{-4}$ to $1.4 \times 10^{-2}$ S/cm |
| B6p | $Li_2CO_3 + LiOH$ | 70-99% | $1.4 \times 10^{-3}$ to $1.6 \times 10^{-2}$ S/cm |
| C1p | $LiClO_4$ | 70-99% | $4.1 \times 10^{-4}$ to $2.1 \times 10^{-3}$ S/cm |
| C2p | $LiPF_6$ | 70-99% | $2.2 \times 10^{-4}$ to $6.1 \times 10^{-3}$ S/cm |
| C3p | $LiBF_4$ | 70-99% | $1.3 \times 10^{-4}$ to $1.6 \times 10^{-3}$ S/cm |
| C4p | $LiBOB + LiNO_3$ | 70-99% | $1.3 \times 10^{-4}$ to $2.3 \times 10^{-3}$ S/cm |
| S1p | Sulfonated polyaniline | 85-99% | $3.2 \times 10^{-5}$ to $9.5 \times 10^{-4}$ S/cm |
| S2p | Sulfonated SBR | 85-99% | $1.1 \times 10^{-4}$ to $1.2 \times 10^{-3}$ S/cm |
| S3p | Sulfonated PVDF | 80-99% | $1.6 \times 10^{-4}$ to $1.2 \times 10^{-4}$ S/cm |
| S4p | Polyethylene oxide | 80-99% | $4.1 \times 10^{-4}$ to $3.2 \times 10^{3^4}$ S/cm |

Example 11: Cycle Stability of Various Rechargeable Lithium Battery Cells

Figure 8:
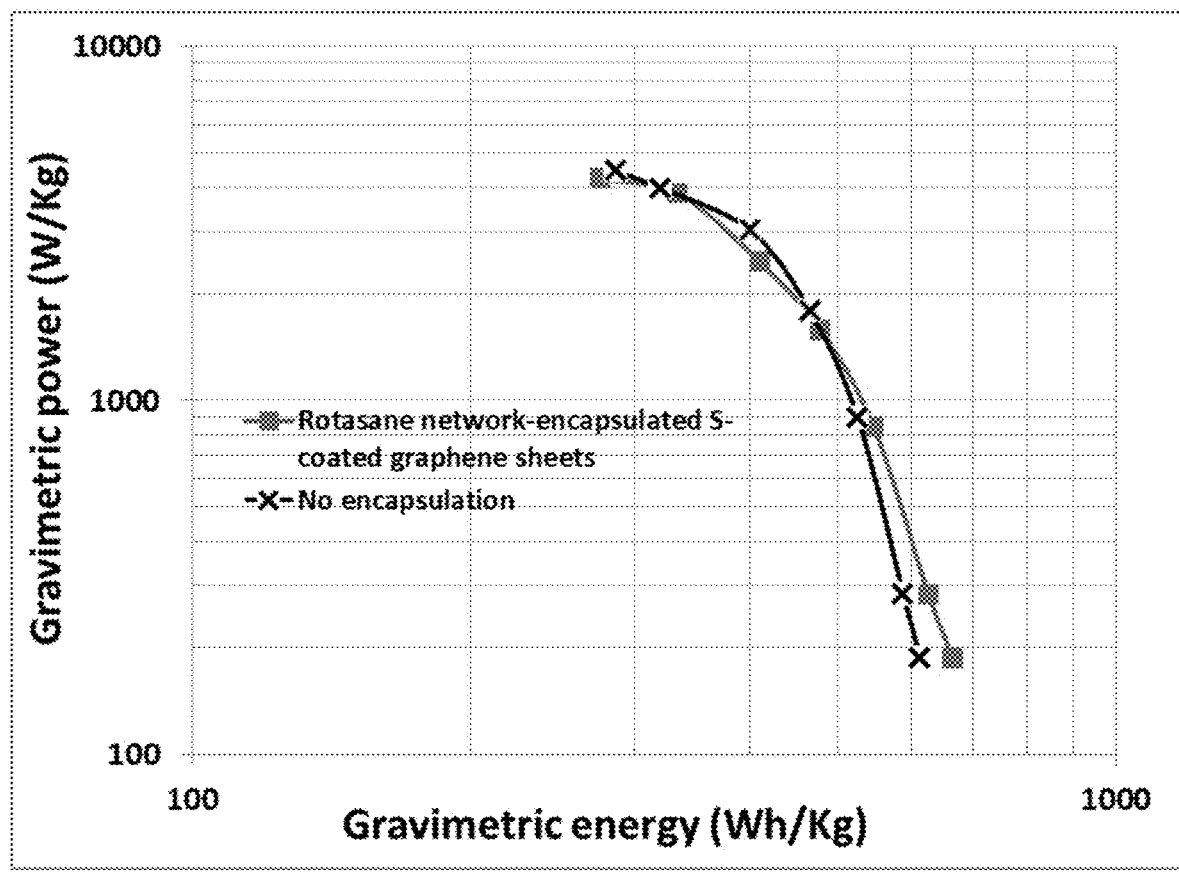
FIG. 8 Ragone plots (cell power density vs. cell energy density) of two Li metal-sulfur cells: one featuring a cathode layer composed of high-elasticity rotaxane polymer network-encapsulated particles of S-coated graphene sheets and the other non-encapsulated.
Figure 9:
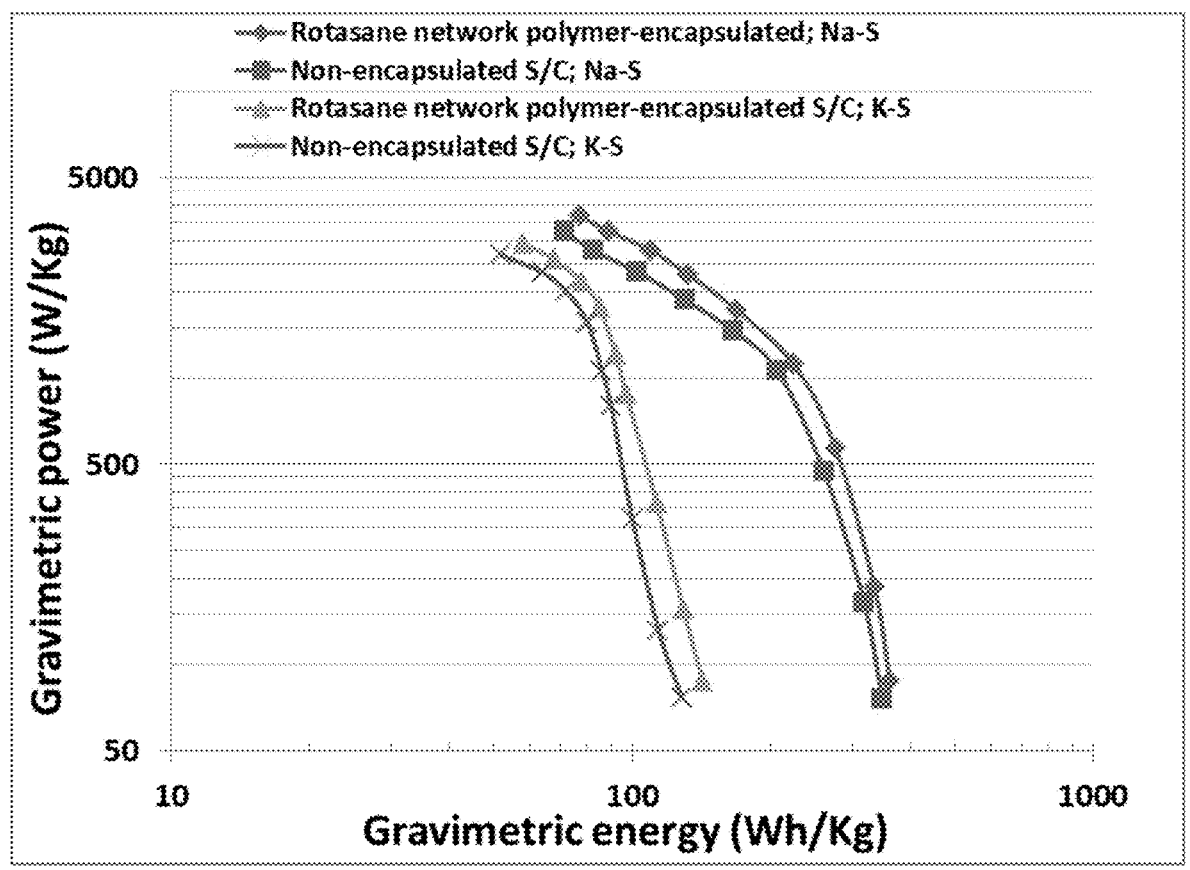
FIG. 9 Ragone plots (cell power density vs. cell energy density) of 4 alkali metal-sulfur cells: Na—S cell featuring high-elasticity polyrotaxane-encapsulated particles of exfoliated graphite worms electrochemically impregnated with sulfur, Na—S cell featuring un-encapsulated particles of exfoliated graphite worms electrochemically impregnated with sulfur, K—S cell featuring high-elasticity polymer-encapsulated particles of exfoliated graphite worms electrochemically impregnated with sulfur, and K—S cell featuring un-protected S-impregnated graphite worms.

FIG. 8 and FIG. 9 indicate that the presence of a high-elasticity rotaxane polymer embracing a sulfur-based cathode does not compromise the energy density of an alkali metal-sulfur cell even though this polymer shell is normally less electron-conducting than a carbon coating and less ion-conducting than a liquid electrolyte. Quite unexpectedly, the energy density of the cell is actually improved, defying the expectations of materials scientists.

In lithium battery industry, it is a common practice to define the cycle life of a battery as the number of charge-discharge cycles that the battery suffers 20% decay in capacity based on the initial capacity measured after the required electrochemical formation. Summarized in Table 2 below are the cycle life data of a broad array of batteries featuring presently invented high-elasticity polymer-encapsulated sulfur cathode particles vs. other types of cathode active materials.

TABLE 2

Cycle life data of various lithium-sulfur batteries.

| Sample ID | Protective means | Type & % of anode active material | Initial capacity (mAh/g) | Cycle life (No. of cycles) |
|---|---|---|---|---|
| CNF-1 | Polyrotaxane network encapsulation | 80% by wt. S + 7% CNF + 3% rotaxane + 5% binder + 5% CB | 1,286 | 1,690 |

TABLE 2-continued

Cycle life data of various lithium-sulfur batteries.

| Sample ID | Protective means | Type & % of anode active material | Initial capacity (mAh/g) | Cycle life (No. of cycles) |
|---|---|---|---|---|
| CNF-2 | Carbon encapsulation | 80% by wt. S + 7% CNF + 3% carbon + 5% binder + 5% CB | 1,280 | 165 |
| AC-1 | No encapsulation | 70% S + 15% AC + 8% binder + 7% CB | 1,258 | 155 |
| AC-2 | Polyrotaxane network (75%) + PEO (25%) | 70% S + 15% AC + 3% polymer mixture + 5% binder + 7% CB | 1,260 | 1,225 |
| Gn-3 | Polyrotaxane network encapsulation | 90% S (coated on graphene sheets) | 1456 | 2,555 |
| Gn-4 | Carbon encapsulation | 90% S (coated on graphene sheets) | 1453 | 188 |
| CB-1 | No encapsulation | 70% S + 22% CB + 8% binder | 1020 | 47 |
| CB-2 | Polyrotaxane network encapsulation | 70% S + 20% CB + 4% UHMW PEO + 6% binder | 1030 | 1320 |

The following observations can be made from the data of Table 2 and FIG. 5-FIG. 9:
1) The presently invented polyrotaxane network encapsulation approach enables the Li—S, Na—S, and K—S batteries to deliver high cycling stability or long cycle life.
2) The invented approach also leads to alkali metal-sulfur batteries having exceptional energy densities and power densities. A cell-level energy density as high as 666 Wh/kg has been achieved with Li—S cells featuring a cathode active material encapsulated by a high-elasticity polyrotaxane network polymer. Also quite surprisingly, the cell delivers a power density as high as 4,242 W/kg, 5 times higher than the typical power density of lithium-ion batteries and that of conventional Li—S cells. This power density improvement is very significant in light of the notion that Li—S cells, being conversion-type cells, operate on some chemical reactions during charge/discharge and, hence, typically deliver very low power densities (typically <<500 W/kg).
3) Similar advantageous features are also observed with Na—S cells and K—S cells. This is evidenced by FIG. 9, which shows the Ragone plots (cell power density vs. cell energy density) of 4 alkali metal-sulfur cells:

In summary, the present invention provides an innovative, versatile, and surprisingly effective platform materials technology that enables the design and manufacture of superior alkali metal-sulfur rechargeable batteries. The alkali metal-sulfur cell featuring a cathode layer containing particulates of sulfur-conducting material hybrid particles encapsulated by a high-elasticity polyrotaxane network polymer exhibits a high cathode active material utilization rate, high specific capacity, high specific energy, high power density, little or no shuttling effect, and long cycle life. When a nanostructured carbon filament web is implemented at the anode to support a lithium film (e.g. foil), the lithium dendrite issue is also suppressed or eliminated.

The invention claimed is:

1. A rechargeable alkali metal-sulfur cell, said alkali metal-sulfur cell comprising:
    (a) an anode active material layer and an optional anode current collector supporting said anode active material layer;
    (b) a cathode active material layer and an optional cathode current collector supporting said cathode active material layer; and
    (c) an electrolyte with an optional porous separator layer in ionic contact with said anode active material layer and said cathode active material layer;
    wherein said cathode active material layer contains multiple particulates of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof and wherein at least one of said particulates is composed of one or a plurality of sulfur-containing material particles being embraced or encapsulated by a thin layer of a high-elasticity polymer having a recoverable tensile strain from 2% to 1,500%, a lithium ion conductivity no less than $1 \times 10^{-6}$ S/cm at room temperature, and a thickness from 0.5 nm to 10 µm, wherein said high-elasticity polymer contains a polyrotaxane network having a rotaxane structure or a polyrotaxane structure at a crosslink point of said polyrotaxane network.

2. The rechargeable alkali metal-sulfur cell of claim 1, wherein said sulfur-carbon hybrid, sulfur-graphite hybrid, sulfur-graphene hybrid, or conducting polymer-sulfur hybrid is a mixture, blend, composite, chemically bonded or physically bonded entity of sulfur or sulfide, with a carbon, graphite, graphene, or conducting polymer material.

3. The rechargeable alkali metal-sulfur cell of claim 1, wherein said rotaxane structure or polyrotaxane structure is selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof.

4. The rechargeable alkali metal-sulfur cell of claim 1, wherein said polyrotaxane network contains a polymer selected from polyethylene glycol, polypropylene glycol, polyethylene oxide, polypropylene oxide, poly (succinic acid), an aliphatic polyester, or a combination thereof.

5. The rechargeable alkali metal-sulfur cell of claim 1, wherein said polyrotaxane network contains a liquid that permeates into spaces inside said network.

6. The rechargeable alkali metal-sulfur cell of claim 1, wherein said metal sulfide contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

7. The rechargeable alkali metal-sulfur cell of claim 6, wherein said metal element M is selected from Li, Na, K, Mg, Zn, Cu, Ti, Ni, Co, Fe, or Al.

8. The rechargeable alkali metal-sulfur cell of claim 1, wherein said metal sulfide contains $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S_1$, $K_2S_2$, $K_2S_3$, $K_2S_4$, $K_2S_5$, $K_2S_6$, $K_2S_7$, $K_2S_8$, $K_2S_9$, or $K_2S_{10}$.

9. The rechargeable alkali metal-sulfur cell of claim 2, wherein said carbon or graphite material in said cathode active material layer is selected from mesophase pitch, mesophase carbon, mesocarbon micro-bead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof.

10. The rechargeable alkali metal-sulfur cell of claim 2, wherein said graphene is selected from pristine graphene, graphene oxide, reduced graphene oxide (RGO), graphene fluoride, nitrogenated graphene, hydrogenated graphene, doped graphene, functionalized graphene, or a combination thereof.

11. The rechargeable alkali metal-sulfur cell of claim 1, wherein said conducting polymer-sulfur hybrid contains an intrinsically conductive polymer selected from polyaniline, polypyrrole, polythiophene, polyfuran, a bi-cyclic polymer, a sulfonated derivative thereof, or a combination thereof.

12. The rechargeable alkali metal-sulfur cell of claim 1, wherein said high-elasticity polymer contains from 0.1% to 50% by weight of a lithium ion-conducting additive or sodium-conducting additive dispersed therein, or contains therein from 0.1% by weight to 10% by weight of a reinforcement nanofilament selected from carbon nanotube, carbon nanofiber, graphene, or a combination thereof.

13. The rechargeable alkali metal-sulfur cell of claim 1, wherein said high-elasticity polymer is mixed with a lithium ion-conducting additive to form a composite wherein said lithium ion-conducting additive is dispersed in said ultra-high molecular weight polymer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq 1$ and $1\leq y\leq 4$.

14. The rechargeable alkali metal-sulfur cell of claim 1, wherein said high-elasticity polymer is mixed with a lithium ion-conducting additive to form a composite wherein said lithium ion-conducting additive is dispersed in said ultra-high molecular weight polymer and is selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

15. The rechargeable alkali metal-sulfur cell of claim 1, wherein said high-elasticity polymer is mixed with an electron-conducting polymer selected from polyaniline, polypyrrole, polythiophene, polyfuran, a bi-cyclic polymer, a sulfonated derivative thereof, or a combination thereof.

16. The rechargeable alkali metal-sulfur cell of claim 1, wherein the high-elasticity polymer forms a mixture or blend with a lithium ion-conducting polymer selected from a lower molecular version of poly(ethylene oxide) (PEO), Polypropylene oxide (PPO), poly(acrylonitrile) (PAN), poly (methyl methacrylate) (PMMA), poly(vinylidene fluoride) (PVDF), Poly bis-methoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof, wherein said lower molecular version is defined as having a molecular weight less than 500,000 g/mole.

17. The rechargeable alkali metal-sulfur cell of claim 1, wherein said high-elasticity polymer has a lithium ion conductivity from $1\times 10^{-5}$ S/cm to $5\times 10^{-2}$ S/cm at room temperature.

18. The rechargeable alkali metal-sulfur cell of claim 1, wherein said cell has a sulfur utilization efficiency from 80% to 99%.

19. The rechargeable alkali metal-sulfur cell of claim 1, wherein said electrolyte is selected from polymer electrolyte, polymer gel electrolyte, composite electrolyte, ionic liquid electrolyte, organic liquid electrolyte, solid-state electrolyte, or a combination thereof.

20. The rechargeable alkali metal-sulfur cell of claim 1, wherein said electrolyte contains a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$, Lithium bis(oxalato)borate (LiBOB), lithium oxalyldifluoroborate ($LiBF_2C_2O_4$), lithium oxalyldifluoroborate ($LiBF_2C_2O_4$), Lithium nitrate ($LiNO_3$), Li-Fluoroalkyl-Phosphates ($LiPF_3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

21. The rechargeable alkali metal-sulfur cell of claim 20, wherein said solvent is selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

22. The rechargeable alkali metal-sulfur cell of claim 1, wherein said anode active material layer contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof.

23. The rechargeable alkali metal-sulfur cell of claim 1, wherein said cell is a lithium ion-sulfur cell and said anode active material layer contains an anode active material selected from the group consisting of:
(a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe) and cadmium (Cd), and lithiated versions thereof;
(b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric;
(c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof;
(d) salts and hydroxides of Sn and lithiated versions thereof;
(e) carbon or graphite materials and prelithiated versions thereof; and
combinations thereof.

24. The rechargeable alkali metal-sulfur cell of claim 1, wherein said cell is a sodium ion-sulfur cell or potassium ion-sulfur cell and said anode active material layer contains an anode active material selected from the group consisting of:
(a) sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
(b) sodium- or potassium-containing alloys or intermetallic compounds of Si, Ge, Sn, Pb, Sb, Bi, Zn, Al, Ti, Co, Ni, Mn, Cd, and their mixtures;
(c) sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof;
(d) sodium or potassium salts;
(e) particles of graphite, hard carbon, soft carbon or carbon particles and pre-sodiated versions thereof; and
combinations thereof.

25. The rechargeable alkali metal-sulfur cell of claim 1, wherein said particulates contain from 80% to 99% by weight of sulfur, metal sulfide, or metal compound based on the total weight of said high-capacity polymer and said sulfur, metal sulfide, or metal compound combined.

26. A cathode active material layer for a rechargeable alkali metal-sulfur cell, wherein said cathode active material layer contains multiple particulates of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof and wherein at least one of said particulates is composed of one or a plurality of sulfur-containing material particles being fully embraced or encapsulated by a thin layer of a high-elasticity polymer having a recoverable tensile strain from 2% to 1,500%, a lithium ion or sodium ion conductivity from $1 \times 10^{-6}$ S/cm to $1.2 \times 10^{-2}$ S/cm at room temperature, and a thickness from 0.5 nm to 10 µm, wherein said high-elasticity polymer contains a polyrotaxane network having a rotaxane structure or a polyrotaxane structure at a crosslink point of said polyrotaxane network.

27. The cathode active material layer of claim 26, wherein said rotaxane structure or polyrotaxane structure is selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof.

28. The cathode active material layer of claim 26, wherein said polyrotaxane network contains a polymer selected from polyethylene glycol, polypropylene glycol, polyethylene oxide, polypropylene oxide, poly (succinic acid), an aliphatic polyester, or a combination thereof.

29. The cathode active material layer of claim 26, wherein said polyrotaxane network contains a liquid that permeates into spaces inside said network.

30. The cathode active material layer of claim 26, wherein said sulfur-carbon hybrid, sulfur-graphite hybrid, sulfur-graphene hybrid, or conducting polymer-sulfur hybrid is a mixture, blend, composite, chemically or physically bonded entity of sulfur or sulfide with a carbon, graphite, graphene, or conducting polymer material.

31. The cathode active material layer of claim 26, wherein said ultrahigh molecular weight polymer is selected from polyacrylonitrile, polyethylene oxide, polypropylene oxide, polyethylene glycol, polyvinyl alcohol, polyacrylamide, poly(methyl methacrylate), poly(methyl ether acrylate), a copolymer thereof, a sulfonated derivative thereof, a chemical derivative thereof, or a combination thereof.

32. The cathode active material layer of claim 26, wherein said metal sulfide contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

33. The cathode active material layer of claim 26, wherein said carbon or graphite material in said cathode active material layer is selected from mesophase pitch, mesophase carbon, mesocarbon micro-bead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof.

34. The cathode active material layer of claim 26, wherein said metal polysulfide contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

35. The cathode active material layer of claim 26, further comprising a binder resin that bonds said multiple particulates together to form said cathode active material layer, wherein said binder resin is not part of said multiple particulates and is external to said multiple particulates.

36. A cathode active material layer for a rechargeable alkali metal-sulfur cell, wherein said cathode active material layer contains a resin binder, an optional conductive additive, and multiple particles of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof, wherein said sulfur-containing material particles are bonded by said resin binder to form an integral solid layer, and wherein said integral solid layer is covered and protected by a thin layer of a high-elasticity polymer having a recoverable tensile strain from 2% to 1,500%, a lithium ion conductivity from $1\times10^{-6}$ S/cm to $1.2\times10^{-2}$ S/cm at room temperature, and a thickness from 0.5 nm to 10 µm, wherein said high-elasticity polymer contains a polyrotaxane network having a rotaxane structure or a polyrotaxane structure at a crosslink point of said polyrotaxane network.

37. The cathode active material layer of claim 36, wherein said rotaxane structure or polyrotaxane structure is selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof.

38. The cathode active material layer of claim 36, wherein said polyrotaxane network contains a polymer selected from polyethylene glycol, polypropylene glycol, polyethylene oxide, polypropylene oxide, poly (succinic acid), an aliphatic polyester, or a combination thereof.

39. The cathode active material layer of claim 36, wherein said polyrotaxane network contains a liquid that permeates into spaces inside said network.

40. The cathode active material layer of claim 36, wherein said integral solid layer is bonded to a cathode current collector by said resin binder.

41. A rechargeable alkali metal-sulfur cell selected from lithium-sulfur cell, sodium-sulfur cell, or potassium-sulfur cell, said alkali metal-sulfur cell comprising: (a) an anode active material layer and an optional anode current collector supporting said anode active material layer; (b) a cathode containing the cathode active material layer of claim 36; and (c) an electrolyte with an optional porous separator layer in ionic contact with said anode active material layer and said cathode active material layer.

42. A powder mass for a lithium-sulfur battery cathode, said powder mass comprising multiple particulates of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof and wherein at least one of said particulates is composed of one or a plurality of sulfur-containing material particles being embraced or encapsulated by a thin layer of a high-elasticity polymer having a recoverable tensile strain no less than 2%, a lithium ion conductivity from $1\times10^{-6}$ S/cm to $1.2\times10^{-2}$ S/cm at room temperature, and a thickness from 0.5 nm to 10 µm, wherein said high-elasticity polymer contains a polyrotaxane network having a rotaxane structure or a polyrotaxane structure at a crosslink point of said polyrotaxane network.

43. The powder mass of claim 42, wherein said rotaxane structure or polyrotaxane structure is selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof.

44. The powder mass of claim 42, wherein said polyrotaxane network contains a polymer selected from polyethylene glycol, polypropylene glycol, polyethylene oxide, polypropylene oxide, poly (succinic acid), an aliphatic polyester, or a combination thereof.

45. The powder mass of claim 42, wherein said polyrotaxane network contains a liquid that permeates into spaces inside said network.

46. The powder mass of claim 42, wherein said sulfur-carbon hybrid, sulfur-graphite hybrid, sulfur-graphene hybrid, or conducting polymer-sulfur hybrid is a mixture, blend, composite, chemically or physically bonded entity of sulfur or sulfide with a carbon, graphite, graphene, or conducting polymer material.

47. The powder mass of claim 42, wherein said ultrahigh molecular weight polymer is selected from polyacrylonitrile, polyethylene oxide, polypropylene oxide, polyethylene glycol, polyvinyl alcohol, polyacrylamide, poly(methyl methacrylate), poly(methyl ether acrylate), a copolymer thereof, a sulfonated derivative thereof, a chemical derivative thereof, or a combination thereof.

48. The powder mass of claim 42, wherein said metal sulfide contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

49. A method of manufacturing a rechargeable alkali metal-sulfur cell of claim 1, comprising:
(a) providing a cathode and an optional cathode current collector to support said cathode;
(b) providing an alkali metal anode, selected from Li, Na, K, or a combination thereof and an optional anode current collector to support said anode;
(c) providing an electrolyte in contact with the anode and the cathode and an optional separator electrically separating the anode and the cathode;
wherein said cathode contains multiple particulates of a sulfur-containing material wherein at least one of said particulates is composed of one or a plurality of sulfur-containing material particles being embraced or encapsulated by a thin layer of a high-elasticity polymer having a recoverable tensile strain no less than 2%, a lithium ion conductivity from $1\times10^{-6}$ S/cm to $1.2\times10^{-2}$ S/cm at room temperature, and a thickness from 0.5 nm to 10 µm, wherein said high-elasticity polymer contains a polyrotaxane network having a rotaxane structure or a polyrotaxane structure at a crosslink point of said polyrotaxane network.

50. The manufacturing method of claim 49, wherein said rotaxane structure or polyrotaxane structure is selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof.

51. The manufacturing method of claim 49, wherein said polyrotaxane network contains a polymer selected from polyethylene glycol, polypropylene glycol, polyethylene oxide, polypropylene oxide, poly (succinic acid), an aliphatic polyester, or a combination thereof.

52. The manufacturing method of claim 49, wherein said polyrotaxane network contains a liquid that permeates into spaces inside said network.

53. The manufacturing method of claim 49, wherein said sulfur-containing material is selected from a sulfur-carbon hybrid, sulfur-graphite hybrid, sulfur-graphene hybrid, conducting polymer-sulfur hybrid, metal sulfide, sulfur compound, or a combination thereof.

54. The manufacturing method of claim 53, wherein said sulfur-carbon hybrid, sulfur-graphite hybrid, sulfur-graphene hybrid, or conducting polymer-sulfur hybrid is a mixture, blend, composite, chemically or physically bonded entity of sulfur or sulfide with a carbon, graphite, graphene, or conducting polymer material.

55. The manufacturing method of claim 49, wherein said high-elasticity polymer has a thickness from 1 nm to 100 nm.

56. The manufacturing method of claim 49, wherein said high-elasticity polymer has a lithium ion conductivity from $1 \times 10^{-6}$ S/cm to $5 \times 10^{-2}$ S/cm.

57. The manufacturing method of claim 49, wherein said providing multiple particulates includes encapsulating or embracing said one or a plurality of sulfur-containing material particles with said thin layer of high-elasticity polymer using a procedure selected from pan coating, air suspension, centrifugal extrusion, vibrational nozzle, spray-drying, ultrasonic spraying, coacervation-phase separation, interfacial polycondensation, in-situ polymerization, matrix polymerization, or a combination thereof.

58. The manufacturing method of claim 49, wherein said providing multiple particulates includes encapsulating or embracing said one or a plurality of sulfur-containing material particles with a mixture of said ultra-high molecular weight polymer with an elastomer, an electronically conductive polymer, a lithium-ion conducting material, a reinforcement material, or a combination thereof.

59. The manufacturing method of claim 58, wherein said lithium ion-conducting material is dispersed in said high-elasticity polymer and is selected from $Li_2CO_3$, $Li_2O$, $Li_2C_2O_4$, LiOH, LiX, $ROCO_2Li$, $HCOLi$, $ROLi$, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

60. The manufacturing method of claim 58, wherein said lithium ion-conducting material is dispersed in said high-elasticity polymer and is selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

61. A method of manufacturing a rechargeable alkali metal-sulfur cell selected from lithium-sulfur cell, sodium-sulfur cell, or potassium-sulfur cell, said method comprising: (a) providing an anode containing an anode active material layer and an optional anode current collector supporting said anode active material layer; (b) providing a cathode containing the cathode active material layer of claim 26; (c) providing an electrolyte with an optional porous separator layer in ionic contact with said anode active material layer and said cathode active material layer; and (d) combining said anode, said cathode, and said electrolyte to form a battery unit and encasing said battery unit in a protective housing to form said rechargeable alkali metal-sulfur cell.

62. A method of manufacturing a rechargeable alkali metal-sulfur cell selected from lithium-sulfur cell, sodium-sulfur cell, or potassium-sulfur cell, said method comprising: (a) providing an anode containing an anode active material layer and an optional anode current collector supporting said anode active material layer; (b) providing a cathode containing a cathode active material layer optionally supported on a cathode current collector; (c) providing a porous separator layer and an electrolyte in ionic contact with said anode active material layer and said cathode active material layer; and (d) implementing a layer of high-elasticity polymer between said cathode active material layer and said separator, wherein said high-elasticity polymer has a recoverable tensile strain no less than 2%, a lithium ion conductivity no less than $10^{-6}$ S/cm at room temperature, and a thickness from 0.5 nm to 10 μm, wherein said high-elasticity polymer contains a polyrotaxane network having a rotaxane structure or a polyrotaxane structure at a crosslink point of said polyrotaxane network.

63. The method of claim 62, wherein said rotaxane structure or polyrotaxane structure is selected from rotaxane, a chemically modified rotaxane (rotaxane derivative), a polymer-grafted rotaxane, polyrotaxane, a co-polymer of polyrotaxane, a graft polymer of polyrotaxane, a polymer blend of polymer of polyrotaxane, a chemically modified polyrotaxane, or a combination thereof.

64. The method of claim 62, wherein said polyrotaxane network contains a polymer selected from polyethylene glycol, polypropylene glycol, polyethylene oxide, polypropylene oxide, poly (succinic acid), an aliphatic polyester, or a combination thereof.

* * * * *